(12) United States Patent
Ohyama et al.

(10) Patent No.: US 7,814,515 B2
(45) Date of Patent: Oct. 12, 2010

(54) DIGITAL DATA DELIVERY SYSTEM AND METHOD OF THE SAME

(75) Inventors: Satoshi Ohyama, Hyogo (JP); Masaaki Higashida, Osaka (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 11/402,823

(22) Filed: Apr. 13, 2006

(65) Prior Publication Data

US 2007/0250873 A1    Oct. 25, 2007

(30) Foreign Application Priority Data

Mar. 30, 2006    (JP) ............................ P2006-093414

(51) Int. Cl.
*H04N 7/18* (2006.01)
*H04N 7/20* (2006.01)

(52) U.S. Cl. .............................. 725/75; 725/71; 725/74; 725/76; 725/77

(58) Field of Classification Search ............. 725/63–64, 725/71, 74–77
See application file for complete search history.

(56) References Cited

U.S. PATENT DOCUMENTS

| | | | | |
|---|---|---|---|---|
| 6,249,319 B1 * | 6/2001 | Post | ............................ | 348/515 |
| 6,779,041 B1 * | 8/2004 | Yoo et al. | .................... | 709/247 |
| 7,114,171 B2 * | 9/2006 | Brady et al. | ................... | 725/77 |
| 7,483,523 B2 * | 1/2009 | Abou-chakra et al. | .... | 379/90.01 |
| 2006/0050705 A1 * | 3/2006 | Kim | ........................... | 370/392 |
| 2006/0271970 A1 * | 11/2006 | Mitchell et al. | ............... | 725/82 |
| 2008/0253348 A1 | 10/2008 | Kushiki et al. | | |

FOREIGN PATENT DOCUMENTS

| | | |
|---|---|---|
| JP | 63-219289 | 9/1988 |
| WO | 2006/027969 | 3/2006 |

* cited by examiner

*Primary Examiner*—John W Miller
*Assistant Examiner*—Gigi L Dubasky
(74) *Attorney, Agent, or Firm*—Wenderoth, Lind & Ponack, L.L.P.

(57) ABSTRACT

A digital data delivery system that delivers video data of a content and audio data of the same content respectively to a first receiver and a second receiver, which are independent of each other, to reproduce the video data and the audio data at the first and second receivers in such a manner as to secure synchronous reproductions between the two data. The digital data delivery system includes a transmission server which delivers a video data packet and a video synchronization signal packet to the first receiver and an audio data packet and an audio synchronization signal packet which indicates a time on the same reference time axis as that of the video synchronization signal packet to the second receiver, the first receiver which adjusts a clock signal based on the video synchronization signal packet and reproduces the video data packet based on this clock signal, and the second receiver which adjusts a clock signal based on the audio synchronization signal packet and reproduces the audio data packet based on this clock signal.

19 Claims, 12 Drawing Sheets

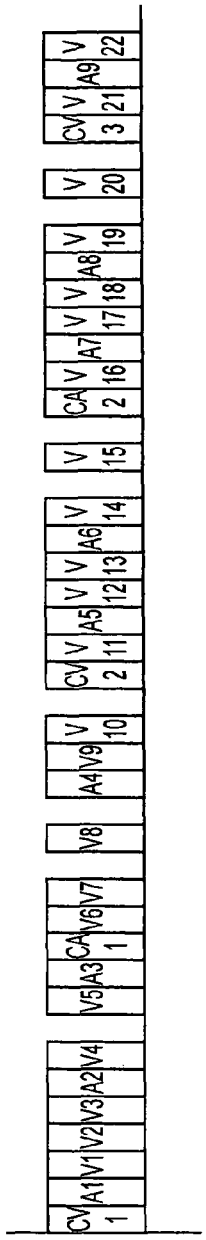
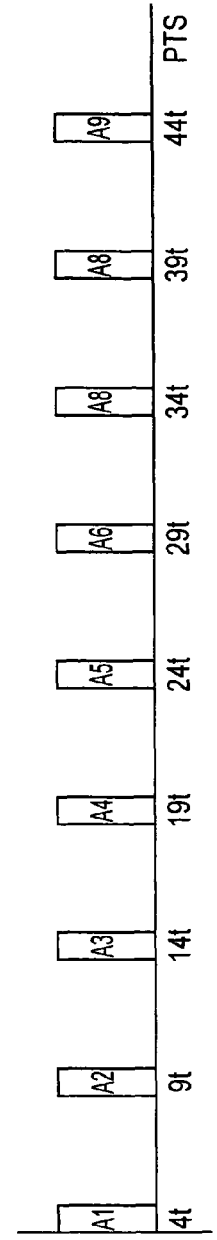
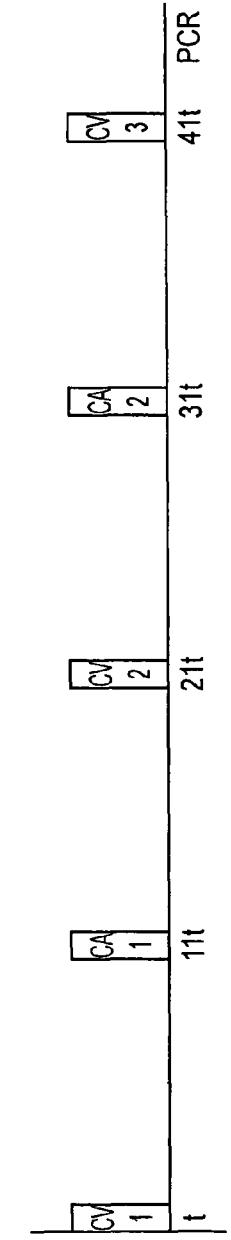
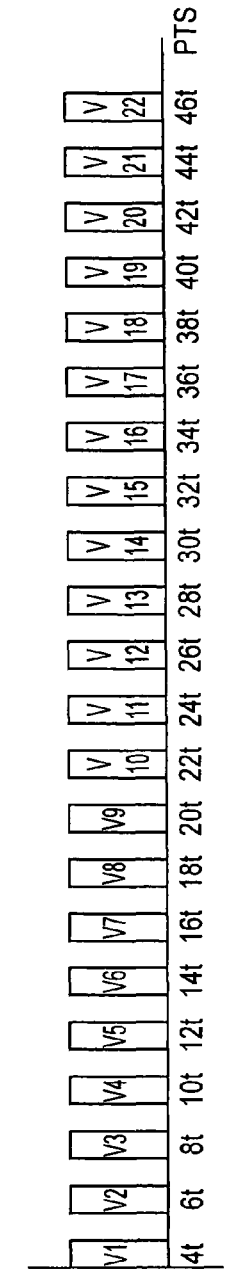

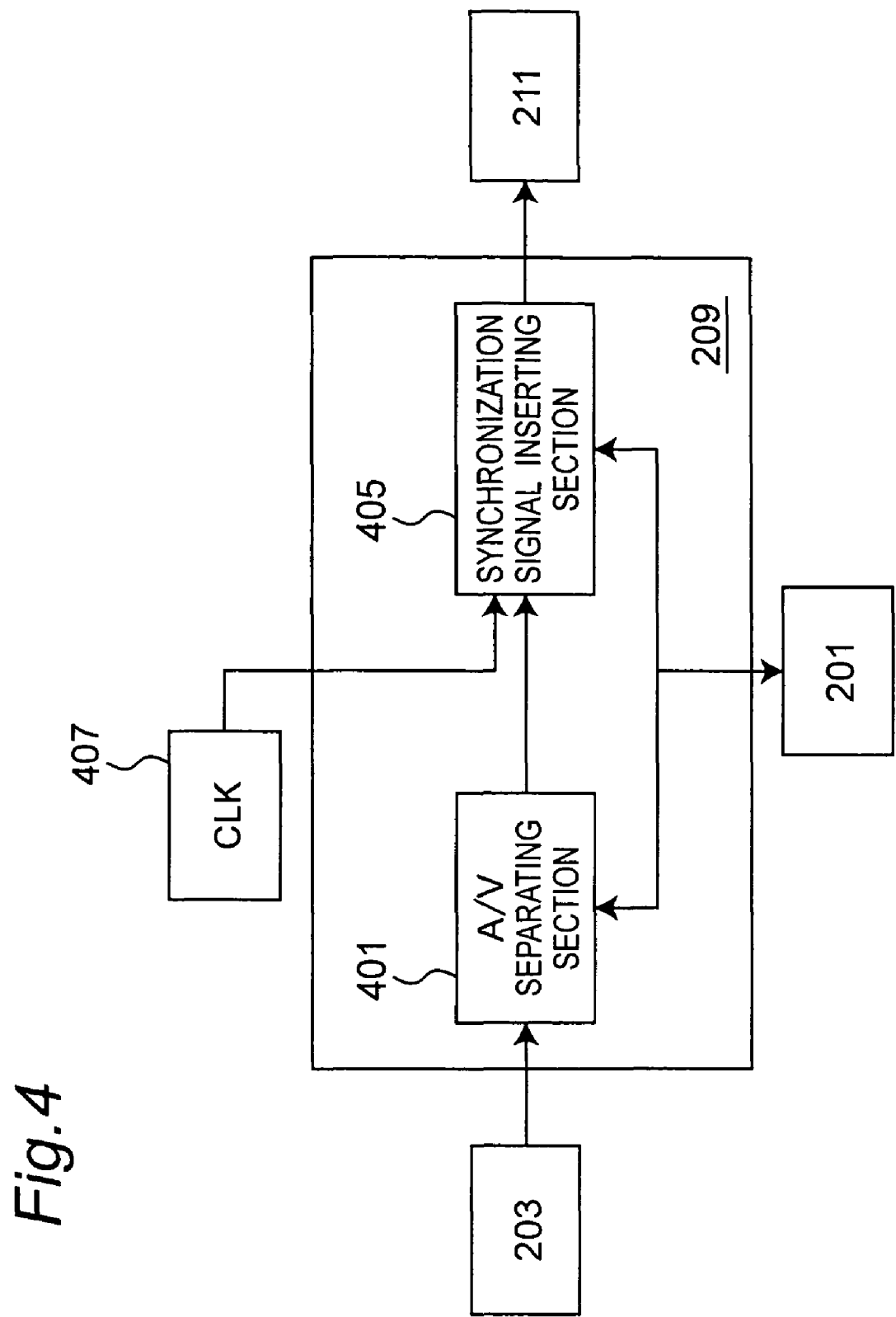

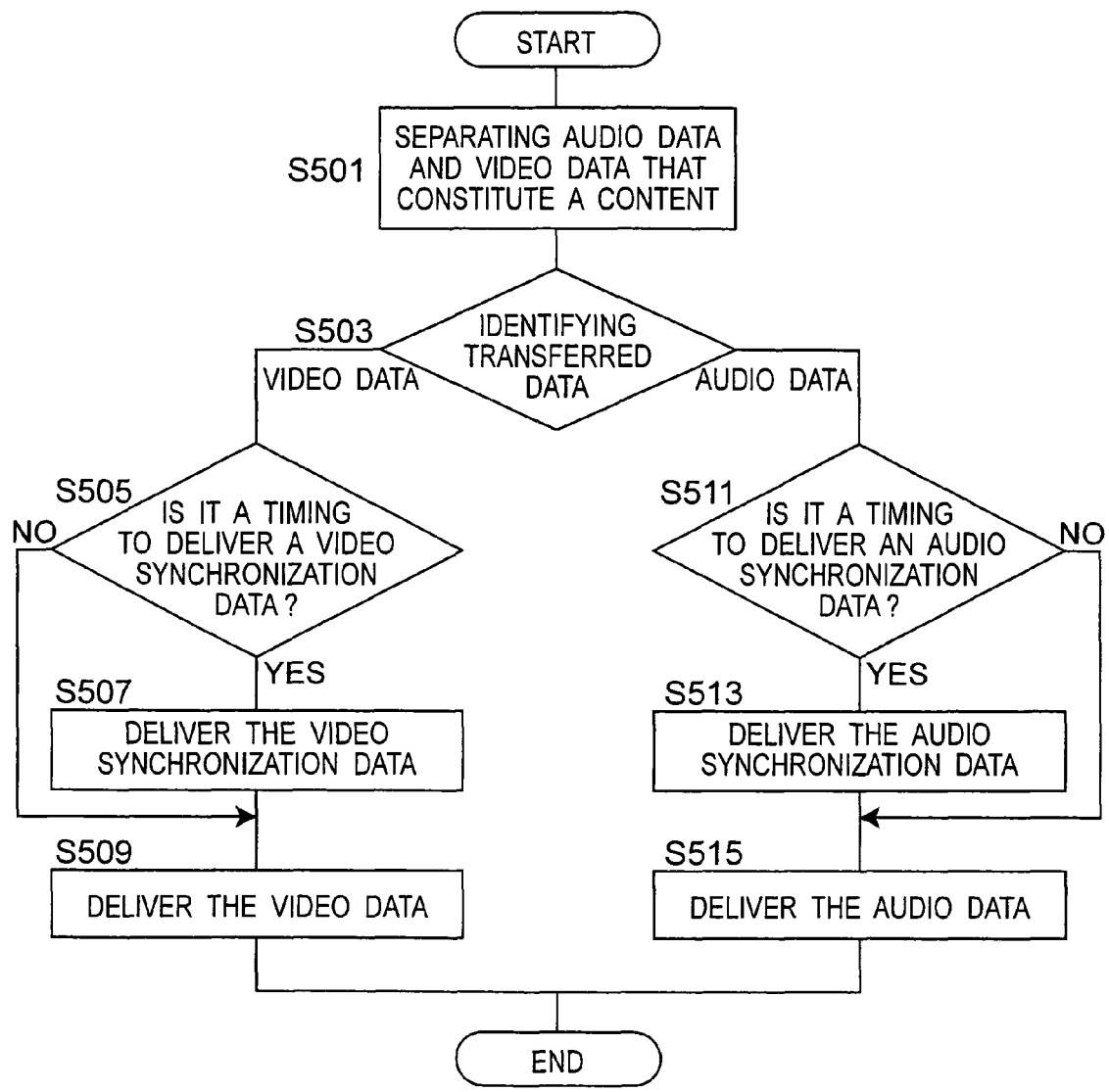

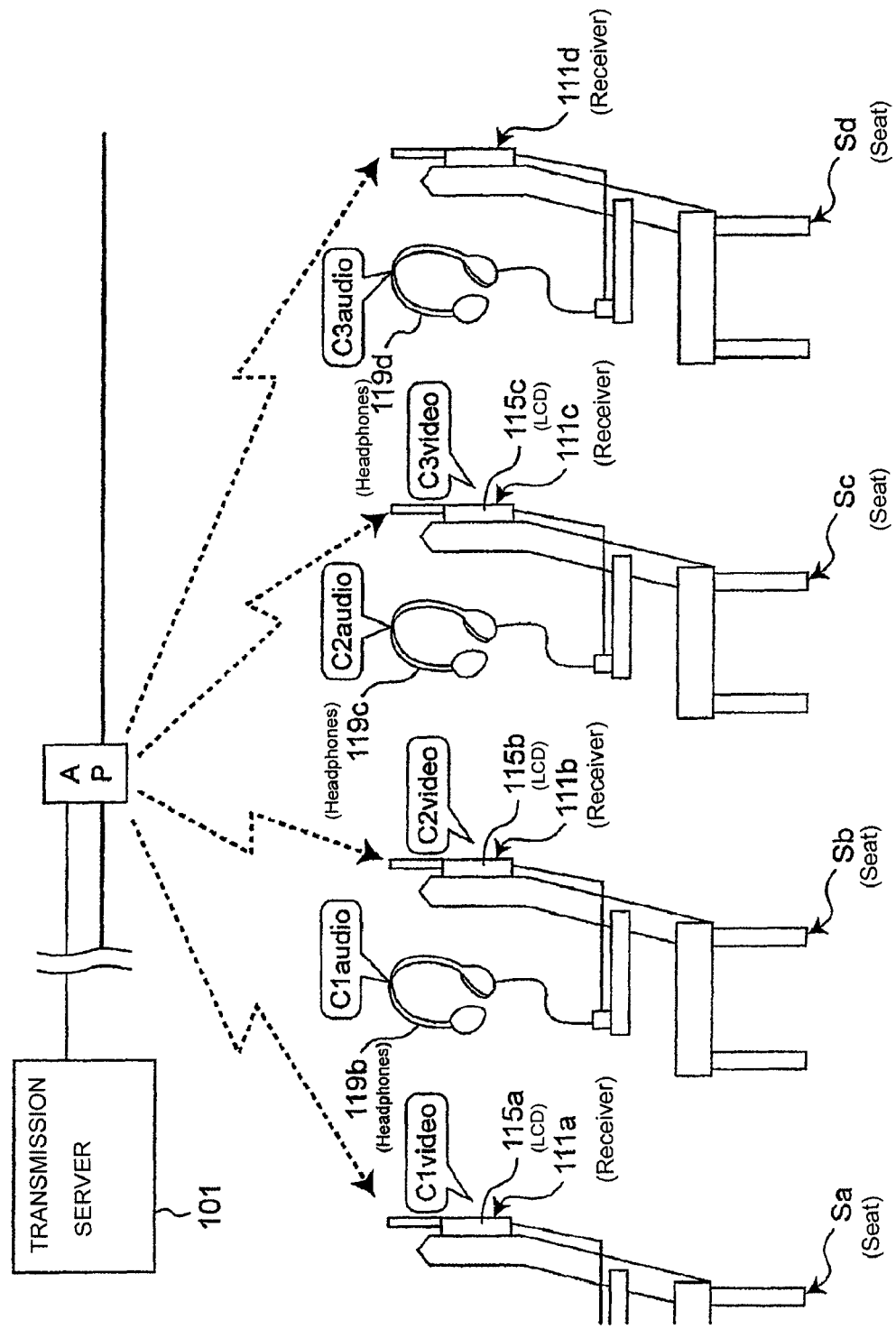

Fig.8
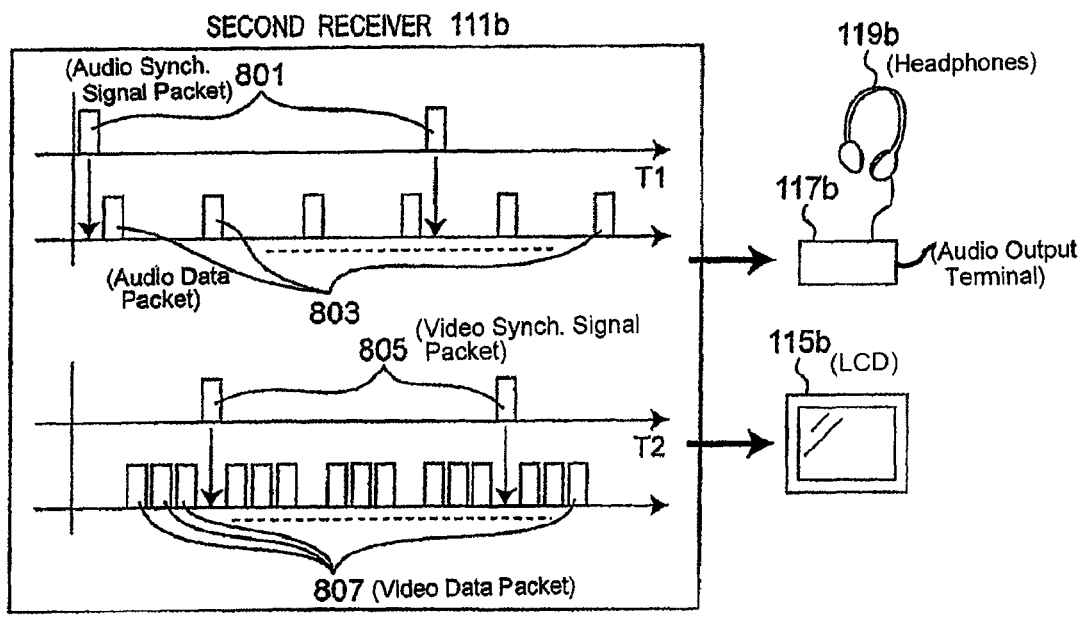
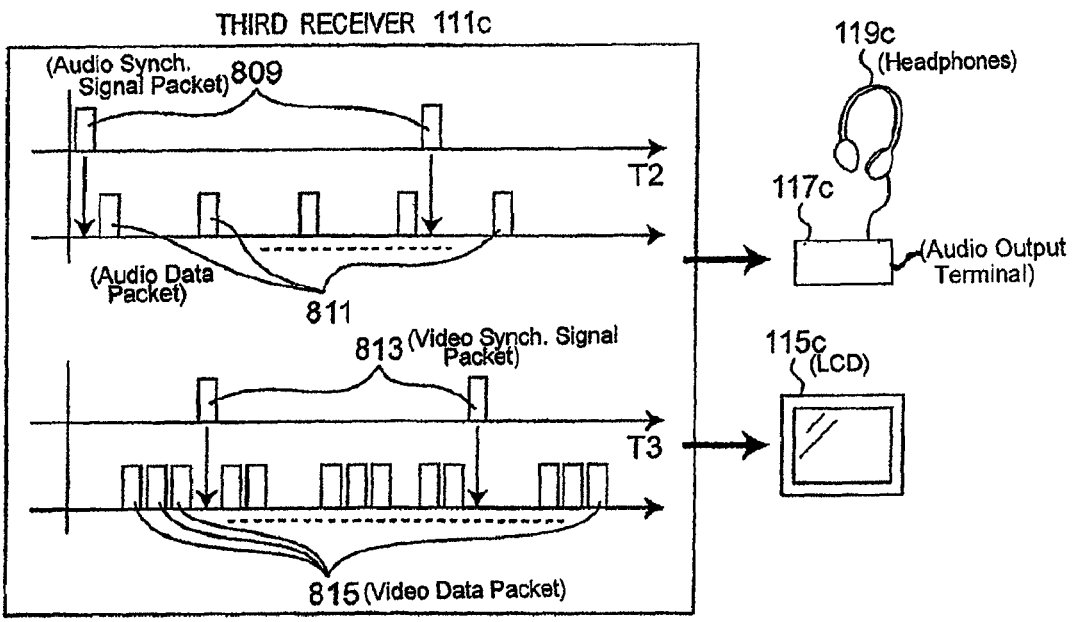

DIGITAL DATA DELIVERY SYSTEM AND METHOD OF THE SAME

BACKGROUND OF THE INVENTION

1. Field of the Invention

The present invention relates to a digital data delivery system. More particularly, this invention relates to a digital data delivery system that has a transmission facility for digitally transmitting at least one data piece including video signals or audio signals and a reception facility for receiving those signals.

2. Related Art

Presently, for example, an airplane for passenger transportation is equipped with an information system for providing passengers with various types of information for emergent use, entertainment use, etc. in its passenger room. According to one aspect, the information system is constituted as an information delivery system equipped with a transmission facility that stores information sources and appropriately delivers the information and a reception facility connected with the transmission facility via a wired and/or wireless transmission channel. The reception facility of the system has a reception facility body, an audio output device (e.g., headphone), and a video output device (e.g., liquid crystal display). The reception facility body is built into each seat and receives such as a video signal, an audio signal, a control signal, etc. and outputs the video signal and the audio signal to the video output device and the audio output device that are connected to the reception facility body. A passenger can enjoy the audio information and video information stored in the transmission facility or generated on the fly thereby with using the reception facility body built in the seat, the audio output device and the video output device.

In some cases, the video output device is provided on a rear face of a headrest of a seat. In this case, the video output device is adapted to output a video for a passenger who sits down behind the seat in which the connected reception facility body is built. Therefore, the reception facility body built in each seat outputs a sound to the audio output device for the passenger who sits down on the seat in which the reception facility body is built and outputs a video to the video output device for the passenger who sits down behind the seat which the reception facility body is built into.

JP-A-63-219289 discloses an information transmission device which can be applied to an information system used in the above-mentioned aspect. In the information transmission device according to JP-A-63-219289, a transmission facility multiplexes a plurality of analog video signals, analog audio signals, and analog control signals and transmits the multiplexed signals with one transmission channel. The transmitted signals are sent via a wireless transmission channel, which constitutes a part of the transmission channel, to the reception facility arranged in each seat. From the multiplexed signals, the reception facility selectively reproduces an audio for a passenger who sits down on the seat at which the reception facility is arranged and a video for a passenger who sits down on another seat behind the seat at which this reception facility is arranged.

In another conventional information supplying facility, there is provided an aspect in which a transmission facility and a reception facility are connected with each other with a digital wired transmission channel. In this aspect, information is digitally compressed and encoded by the transmission facility and multiplexed with a plurality of programs and services and then delivered as digital data through the wired transmission channel.

Information of the digitally compressed/encoded and multiplexed programs or services is selectively decoded by the reception facility built in each seat. In a case where the video output device is equipped on the rear face of each seat as in the case of an aspect described in JP-A-63-219289, the reception facility decodes data of a program or a service for a passenger seated behind the seat. Then, the reception facility outputs a video signal of the decoded program or service to the video output device connected to the reception facility. On the other hand, the audio signal of the program or service decoded by the reception facility is delivered again through the wired transmission channel, so that this decoded audio signal is received by another reception facility build in a seat behind that seat and output by the another reception facility to the audio output device connected thereto. That is, in the present example, each reception facility built in the seat decodes a set of video and audio data contained in a program or a service for the passenger seated on a seat behind the seat. Therefore, the audio data is decoded and then returned to the wired transmission channel, and the decoded audio data is transmitted to another reception facility arranged at a seat right behind, and output to the audio output device connected to the reception facility. A body that decodes data and a body that reproduces and outputs the same are thus made different from each other in order to keep synchronization between the decoded audio and the corresponding decoded video by relegating the decoding of the compressed and encoded audio and video data to one instrument of the reception facility.

In the aspect described above, a decoded audio signal is transmitted via a transmission channel. Therefore, in this aspect, a transmission channel employed (e.g., Ethernet connected with cables) may be obliged to transmit relatively large amount of information.

However, as a matter of course, equipping with wired transmission channels throughout the airplane's passenger room results in an increase in weight of the airplane. In addition, when changing a layout of the seats in the passenger room, the wired transmission channels are needed to be disconnected once near the seats, so that it is necessary to schedule much time for the change of the layout in an operational plan of the airplane. This results in a decrease in efficiency of the operation of the airplane. For this reason, it is greatly desired to provide a wireless transmission channel between a transmission facility and a reception facility arranged in each seat by using presently available digital broadcasting and communicating technologies.

However, a wireless transmission channel is not better than a wired one in view of its transmission capacity. Therefore, as a technological methodology, it is not desirable that a signal once decoded by one reception facility is transmitted again through the transmission channel so as to be received and reproduced by another reception facility, as in the case of the conventional art.

In order to avoid such problem, one technological methodology is naturally brought to our mind that decodes a compressed and encoded video signal of a program or service using a reception facility built in one seat and reproduces the same for a passenger sitting on a seat behind the seat and simultaneously, decodes and reproduces a compressed and encoded audio signal of the same program or service using another reception facility built in the back seat. However, in this case, reception facilities respectively receive compressed and encoded video and audio signals, and mutually independently, decode and reproduce the received signals, resulting in a concern for an asynchronous reproduction of the video signal and the audio signal.

SUMMARY OF THE INVENTION

The present invention has been developed to solve the above-mentioned problem. That is, it is an object of the present invention to provide a digital data delivery system which can deliver first digital data and second digital data individually to a first reception facility and a second reception facility that are independent from each other, to reproduce the first digital data and the second digital data keeping synchronization therebetween.

According to an aspect of the present invention, there is provided a transmission server for digitally delivering a data packet to a receiver through a transmission channel which includes: a generating section that generates a video data packet including digital data of video information of a content, a video synchronization signal packet including a video synchronization signal, an audio data packet including digital data of audio information of the same content, and an audio synchronization signal packet including an audio synchronization signal; and a delivering section that can deliver the video data packet and the video synchronization signal packet to a first receiver and deliver the audio data packet and the audio synchronization signal packet to a second receiver.

According to the present invention, preferably, the video data packet includes video reproduction timing data which includes information on a timing at which the video data packet is reproduced; and the audio data packet includes audio reproduction timing data which includes information on a timing at which the audio data packet is reproduced.

According to the present invention, preferably, the video synchronization signal includes a video data reproducing base time value which correlates the video reproduction timing data with a first time on a predetermined reference time axis; and the audio synchronization signal includes an audio data reproducing base time value which correlates the audio reproduction timing data with a second time on the predetermined reference time axis.

According to the present invention, preferably, the video information and the audio information are respectively compressed and encoded according to MPEG standards; and the video reproduction timing data is based on a presentation time stamp of the video information and the audio reproduction timing data is based on a presentation time stamp of the audio information.

According to the present invention, preferably, said delivering section delivers the video data packet and the audio data packet as RTP packets and delivers the video synchronization signal packet and the audio synchronization signal packet as RTCP packets.

According to the present invention, preferably, said delivering section delivers data packets of said content or a plurality of contents which includes said content to said first receiver and said second receiver according to a multicast scheme.

According to the present invention, it is preferable to further include a contents reference table generating section that generates a contents reference table which includes information on a method for delivering said content or the plurality of contents, wherein said delivering section delivers the contents reference table to said first receiver and said second receiver.

According to the present invention, preferably, the contents reference table includes information on at least one of a port number and a multicast address which said delivering section uses for delivering the audio data packet, the audio synchronization signal packet, the video data packet, and the video synchronization signal packet which are included in either one content of said content or the plurality of contents.

According to another aspect of the present invention, there is provided a receiver for receiving a first video data packet including digital data of video information of a first content, a first video synchronization signal packet including a video synchronization signal for the first video data packet, a second audio data packet including digital data of audio information of a second content, and a second audio synchronization signal packet which includes an audio synchronization signal for the second audio data packet, both of which are delivered through a transmission channel, which has: a first buffer section that buffers the first video data packet; a second buffer section that buffers the second audio data packet; a first clock signal generating section that can adjust a clock signal based on the first video synchronization signal packet; a second clock signal generating section that can adjust a clock signal based on the second audio synchronization signal packet; a first decoder section that reproduces the first video data packet based on a first clock signal generated by said first clock signal generating section; and a second decoder section that reproduces the second audio data packet based on a second clock signal generated by said second clock signal generating section.

According to the present invention, preferably not only the first video data packet, the first video synchronization signal packet, the second audio data packet, and the second audio synchronization signal packet which are delivered according to a multicast scheme but also a first audio data packet including digital data of audio information of the first content, a first audio synchronization signal packet including audio synchronization information for the first audio data packet, a second video data packet including digital data of video information of the second content, and a second video synchronization signal packet including video synchronization information for the second video data packet which are also delivered according to the multicast scheme are received by said receiver, and said receiver further includes a contents selection commanding section that controls a handling of a packet which is included in the received first video data packet, the received first video synchronization signal packet, the received first audio data packet, the received first audio synchronization signal packet, the received second video data packet, the received second video synchronization signal packet, the received second audio data packet, or the received second audio synchronization signal packet and is to be transferred to said first buffer section, said second buffer section, said first clock signal generating section, or said second clock signal generating section so that said first decoder section reproduce the first video data packet based on the first video synchronization signal packet and so that said second decoder section reproduce the second audio data packet based on the second audio synchronization signal packet.

According to the present invention, preferably, said receiver is equipped to a seat in a passenger transportation facility.

According to a further aspect of the present invention, there is provided a digital data delivery system which includes a transmission facility that includes a transmission server and digitally delivers a data packet through a transmission channel; and a reception facility which includes a first receiver and a second receiver for receiving the data packet, wherein: said transmission server includes: a generating section that generates a first video data packet having digital data of video information of a first content, a first video synchronization signal packet having a first video synchronization signal, a first audio data packet having digital data of audio information of the first content, and a first audio synchronization signal packet having a first audio synchronization signal; and a delivering section that can deliver the first video data packet and the first video synchronization signal packet to said first receiver and deliver the first audio data packet and the first audio synchronization signal packet to said second receiver; said first receiver can receive the first video data packet and the first video synchronization signal packet and includes: a first buffer section that buffers the first video data packet; a first clock signal generating section that can adjust a clock signal based on the first video synchronization signal packet; and a first decoder section that reproduces the first video data packet based on a first clock signal generated by said first clock signal generating section; and said second receiver can receive the first audio data packet and the first audio synchronization signal packet and includes: a second buffer section that buffers the first audio data packet; a second clock signal generating section that can adjust a clock signal based on the first audio synchronization signal packet; and a second decoder section that reproduces the first audio data packet based on a second clock signal generated by said second clock signal generating section.

According to the present invention, preferably, said generation section can further generate a second video data packet including digital data of video information of a second content and a second video synchronization signal packet including a second video synchronization signal; said delivering section can further deliver the second video data packet and the second video synchronization signal packet to said second receiver; and said second receiver can receive the second video data packet and the second video synchronization signal packet and further includes: a third buffer section that buffers the second video data packet; a third clock signal generating section that can adjust a clock signal based on the second video synchronization signal packet; and a third decoder section that reproduces the second video data packet based on a third clock signal generated by said third clock signal generating section.

According to the present invention, preferably, the first video data packet includes first video reproduction timing data which is information on a timing at which the first video data packet is reproduced; the second audio data packet includes second audio reproduction timing data which is information on a timing at which the second audio data packet is reproduced; and the first audio data packet includes first audio reproduction timing data which is information on a timing at which the first audio data packet is reproduced.

According to the present invention, preferably, the first video synchronization signal includes a first video data reproducing base time value that correlates the first video reproduction timing data with a first time on a predetermined first reference time axis; and the first audio synchronization signal includes a first audio data reproducing base time value that correlates the first audio reproduction timing data with a second time on the predetermined first reference time axis.

According to the present invention, preferably, the second video synchronization signal includes a second video data reproducing base time value that correlates the second video reproduction timing data with a third time on a predetermined second reference time axis.

According to the present invention, preferably, said transmission facility further includes a radio-wave repeater connected with said transmission server with a wired transmission channel; and said transmission channel between said radio-wave repeater and said reception facility is a wireless transmission channel.

According to the present invention, preferably, said delivering section of said transmission server delivers a data packet of the first content or a plurality of contents which includes the first content to said first receiver and said second receiver according to a multicast scheme.

According to the present invention, preferably, said transmission server further includes a contents reference table generating section that generates a contents reference table which is information on a method for delivering the first content or the plurality of contents; and said delivering section delivers the contents reference table to said first receiver and said second receiver.

According to the present invention, preferably, the contents reference table includes information on at least one of a port number and a multicast address which said delivering section uses for delivering the audio data packet, the audio synchronization signal packet, the video data packet, and the video synchronization signal packet which are included in either one content of the first content or the plurality of contents.

According to a still further aspect of the present invention, there is provided a method for, in a digital data delivery system including a transmission facility that digitally delivers a plurality of data packets through a transmission channel and a reception facility that includes at least two receivers for receiving the plurality of data packets, delivering the plurality of data packets from the transmission facility to the first receiver and the second receiver of the reception facility, which includes: generating a first delivery data packet which is digital data of video information on a content; generating a second delivery data packet which is digital data of audio information on the same content; generating a first synchronization signal packet including a first data base time value which correlates a reproduction timing of the first delivery data packet with a first time on a predetermined reference time axis; generating a second synchronization signal packet including a second data base time value which correlates a reproduction timing of the second delivery data packet with a second time on the predetermined reference time axis; delivering the first delivery data packet and the first synchronization signal packet to the first receiver; and delivering the second delivery data packet and the second synchronization signal packet to the second receiver.

According to the present invention, preferably, said delivering the first delivery data packet and the first synchronization signal packet delivers the first delivery data packet as an RTP packet and the first synchronization signal as an RTCP packet; and said delivering the second delivery data packet and the second synchronization signal packet delivers the second delivery data packet as an RTP packet and the second synchronization signal as an RTCP packet.

According to the present invention, preferably, said delivering the first delivery data packet and the first synchronization signal packet and said delivering the second delivery data packet and the second synchronization signal packet deliver data packets by using a multicast scheme, and said method further includes: generating a contents reference table which is information on a method for delivering contents; and delivering the contents reference table to the first receiver and the second receiver.

By the digital data delivery system according to the present invention, a first reproduction timing for reproducing the first data in the first receiver and a second reproduction timing for reproducing the second data in the second receiver are synchronized substantially completely without a need to synchronize receivers of the system with each other.

BRIEF DESCRIPTION OF THE DRAWINGS

FIGS. 3A, 3B, 3C, and 3D are schematic diagrams of content data;

FIG. 4 is a block diagram of a data stream generating section;

FIG. 5 is a flowchart of an operation for generating delivered content data;

FIG. 6 is a schematic diagram of an example of delivering information in a passenger room;

FIG. 8 is a schematic diagram of reproduction of videos and audios in a second receiver and a third receiver in synchronization with each other;

DETAILED DESCRIPTION OF THE INVENTION

In the following, embodiments of the present invention will be described in detail with reference to attached drawings. It is to be noted that these embodiments only exemplify the invention.

First Embodiment

Figure 1:
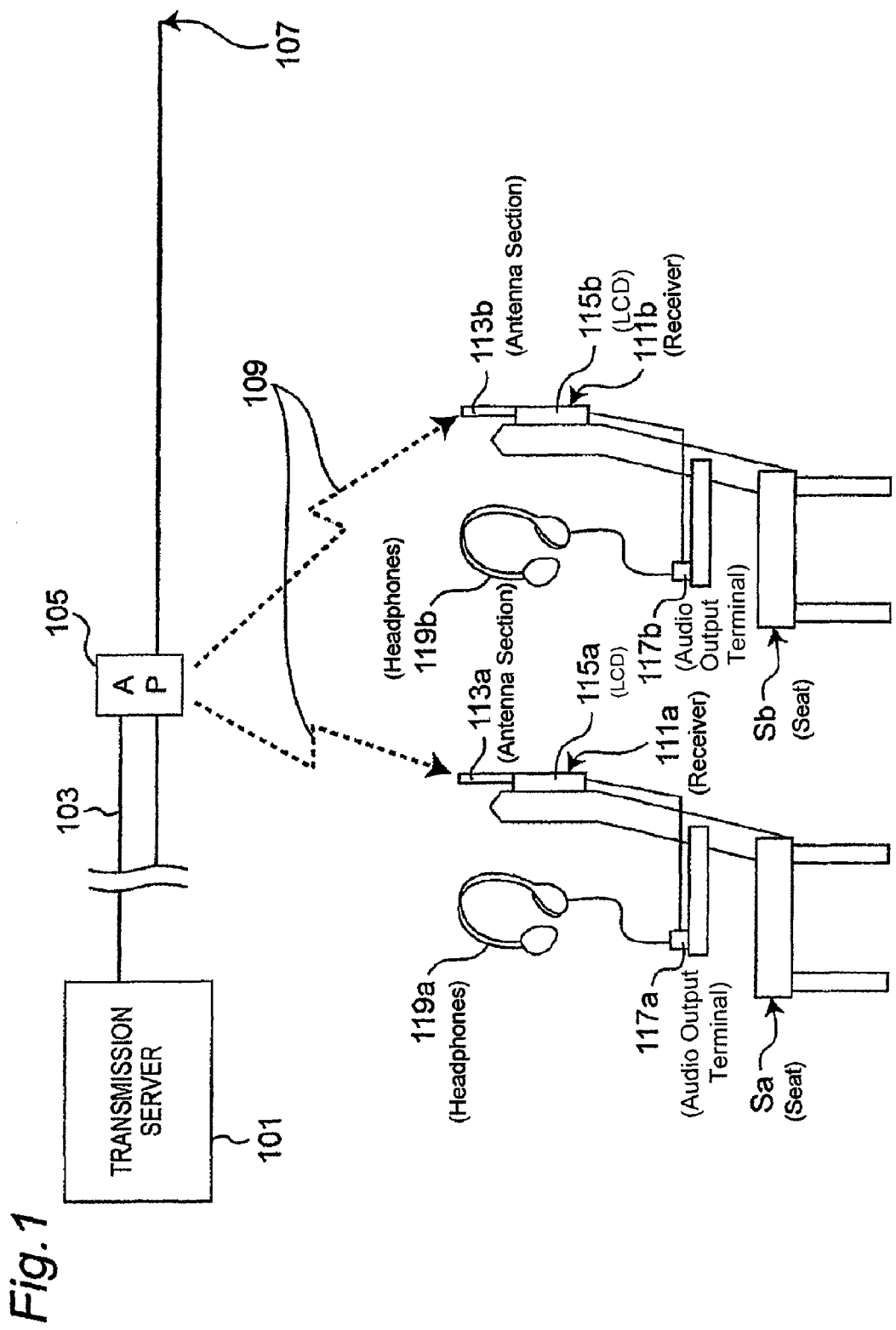
FIG. 1 is a schematic diagram of a configuration of a digital data delivery system according to a first embodiment.

The first embodiment is an information system in an airplane's passenger room employing a digital data delivery system according to the present invention. FIG. 1 is a schematic diagram of a part of the airplane's passenger room from a side view.

First, components of the present system are outlined. The present system is roughly divided into a transmission facility and a reception facility.

<Outline of Transmission Facility Configuration>

First, the components of the transmission facility are described. The transmission facility has a transmission server 101 and an access point 105, which is a radio-wave repeater having a function to be connected with a wired transmission channel. The transmission server 101 has a function to store content data (data of a program, a service, etc.) to be provided (delivered) to passengers, a function to generate a data stream based on the content data, and a function to deliver the generated data stream to the reception facility. The transmission server 101 can further have a function, for example, to process a voice of, for example, an attendant or a video through a camera equipped outside the airplane, convert it into digital data, generate a data stream from these digital data, and deliver the generated data stream to the reception facility on a real-time basis. In this case, the content data can include video data, audio data, and a variety of control data. Such pieces of data may be stored with the pieces compressed and encoded in accordance with predetermined rules (e.g., MPEG standards). A data stream refers to a digital data string, which is, for example, obtained by multiplexing at least one piece of digital data generated by compressing and encoding or only encoding at least one type of data (audio data, video data, control data, etc.) that constitute a part of content data. This operation of generating a data stream from content data is detailed later.

A data stream delivered from the transmission server 101 is sent via a wired transmission channel 103 to the access point 105. The access point 105 can be installed on a ceiling section 107 of a passenger room, for example, to deliver data to the reception facility via a wireless transmission channel 109. Communication between the transmission server 101 and the access point 105 might as well comply with rules of so-called the Internet, which is a packet communication network. However, it may comply with any other communication rules than those of the Internet. When the Internet is used, the transmission server 101 and the access point 105 may be connected with each other by the Ethernet etc., so that they can exchange packets as data frames compliant with the Transmission Control Protocol (TCP) or the User Datagram Protocol (UDP), and the Internet Protocol (IP) according to a predetermined data transfer procedures. The access point 105 may exchange data with the reception facility equipped in a seat by using a data frame compliant with, for example, IEEE802.11b etc. as a data link layer and also using its communication procedure.

<Outline of Reception Facility Configuration>

Next, components of the reception facility are described. The reception facility comprises first and second receivers 11a and 11b disposed in seats Sa and Sb respectively, liquid crystal displays (LCDs) 115a and 115b serving as video output devices, audio output terminals 117a and 117b, and headphones 119a and 119b serving as audio output devices. The LCDs 115a and 115b are respectively equipped on rear faces of head rests of the seats in such a manner that a video can be provided to a passenger who sits on a seat behind the seat in which the connected receiver is built. As a matter of course, the number of the seats is not limited to two. In a case where the airplane has three or more seats, the present system can be equipped with a third receiver or later receivers etc.

The first and second receivers 111a and 111b are equipped with antenna sections 113a and 113b respectively. The first and second receivers 111a and 111b each of which has a function to receive a radio-wave from the access point 105 with the antenna sections 113a or 113b, a function to extract a packet (e.g., IP packet (IP datagram) when using the Internet) from a received data frame, a function to reconstruct the data stream from extracted packets, a function to analyze a data stream and demultiplex the multiplexed one or more content data in the data stream into various types of data (audio data, video data, control data, etc.), a function to buffer the packets of the data of various types, and a function to decode and reproduce the buffered packets at an appropriate timing based on information about a reproduction timing included in the control data, audio data, video data, etc. When reproducing the received content data, the first and second receivers 111a and 111b operates independently from each other to deliver the video signals to the LCDs 115a and 115b and the audio signals to the audio output terminals 117a and 117b. The operation for reproducing the content in the first and second receivers 111a and 111b is detailed later. There is no particular limitation to a protocol used in the communication among the transmission server 101, the access point 105, and the receivers 111a and 111b. Any protocol may be used to embody the present invention. In this case, content data etc. to be delivered only needs to be configured in compliance with the protocol employed. It is to be noted that in the case that the Internet is utilized, IP packets constituting a data stream can include, for example, a UDP packet (UDP segment), and the UDP packet can include a packet compliant with the real-time transfer protocol (RTP). Furthermore, packets compliant with the RTP control protocol (RTCP) can be exchanged with the transmission server via the access point 105.

The LCDs 115*a* and 115*b* display videos based on the video signals sent from the first and second receivers 111*a* and 111*b* respectively. Further, the headphones 119*a* and 119*b* connected with the audio output terminals 117*a* and 117*b* output audios based on the audio signals sent from the first and second receivers 111*a* and 111*b*, respectively.

It should be noted that, for example, a audio to be reproduced by the first receiver 111*a* is audio information to be provided to a passenger who sits on the seat Sa, while a video to be reproduced and displayed on the LCD 115*a* simultaneously with the reproduction of that audio is video information to be provided to a passenger who sits on the seat Sb. Similarly, the second receiver 111*b* outputs audio information to the headphone 119*b*, which is to be provided to the passenger on the seat Sb and, simultaneously, outputs video information to the LCD 115*b*, which is to be provided to the passenger who sits on a seat (not shown) arranged behind the seat Sb.

<Configuration of Transmission Server>

Figure 2:
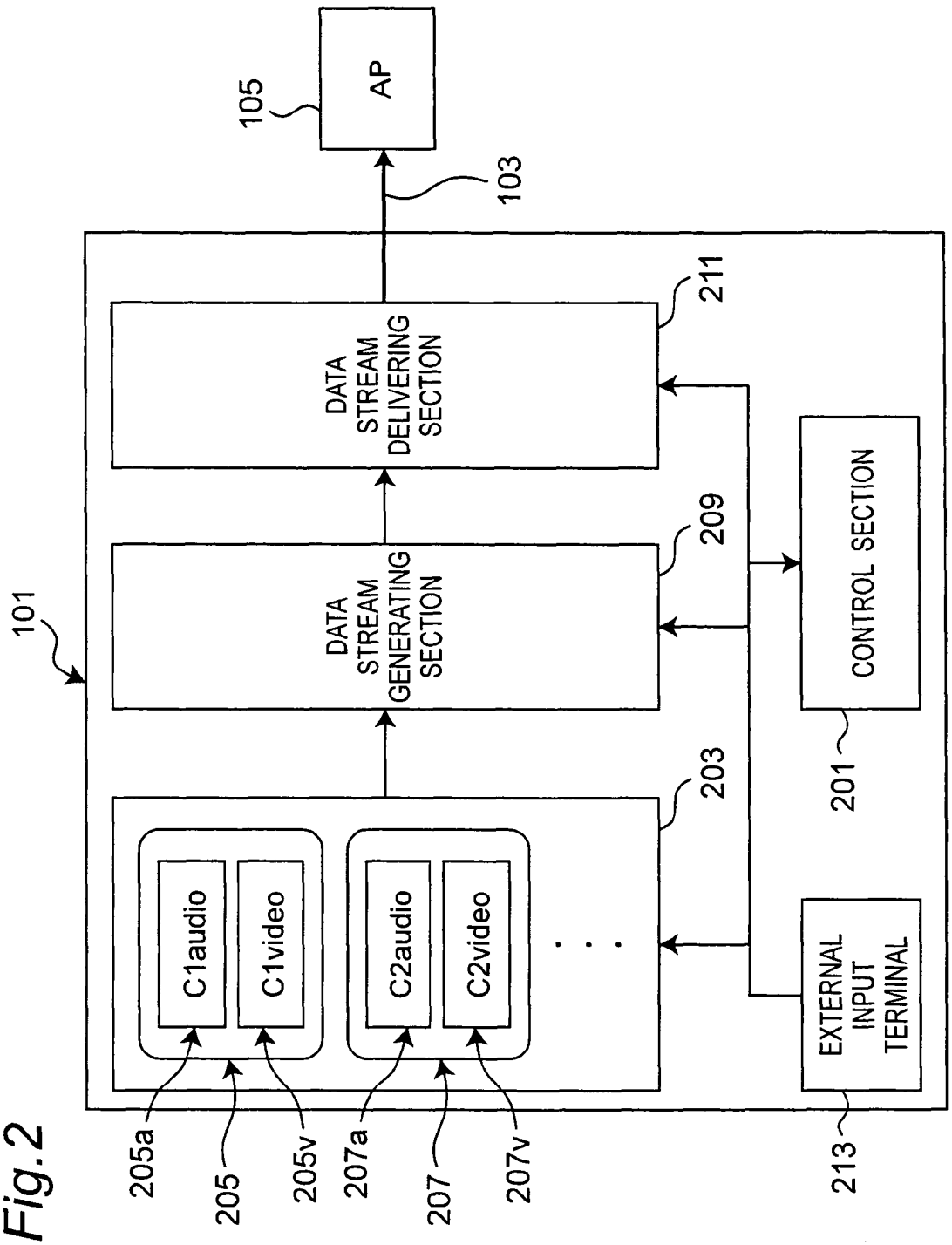
FIG. 2 is a block diagram of a transmission facility according to the first embodiment.

Next, with reference to FIG. 2, the transmission server 101 is described. FIG. 2 is a block diagram of the transmission server 101. The transmission server 101 has a control section 201 for controlling the other components of the server, a storage section 203 for storing one or more content data 205, 207, etc., a data stream generating section 209 for generating a data stream from the pieces of content data 205, 207, etc., and a data stream delivering section 211 for delivering the generated data stream. The transmission server 101 may further have an external input terminal 213 for inputting audio and/or video from outside.

The transmission server 101 may further comprise, for example, a clock signal generator (not shown) in the data stream generating section 209, by which the transmission server 101 can generate a data stream using the clock signals generated.

The components of the transmission server 101 may be realized with a central processing unit (CPU), a memory, a hard disk drive (HDD), a compact disk drive (CD drive), a digital versatile disk drive (DVD drive), a Blu-ray Disc drive (BD drive), an audio/video input terminal, and a dedicated circuit specialized in specific signal processing, as well as a program that can be executed by the CPU. It is to be noted that data (e.g., first content data 205) to be stored in the storage section 203 may include audio data and/or video data (e.g., first audio data 205*a* and/or first video data 205*v*) etc. and be coded in accordance with, for example, the MPEG scheme and be stored. In this figure, the first content data 205 includes a first audio data (C1audio) 205*a* and a first video data (C1video) 205*v* as well as a first video/first audio synchronization data (not shown), while the second content data 207 includes a second audio data (C2audio) 207*a* and a second video data (C2video) 207*v* as well as a second video/second audio synchronizing data (not shown).

<Operations to Generate Data Stream>

Next, a generation of a data stream in the data stream generating section 209 is described below.

<<Configuration of Content Data>>

FIGS. 3A, 3B, 3C, and 3D are schematic diagrams of the first content data 205, which is one of content data. The first content data 205 shown in FIG. 3A includes the first audio data C1audio 205*a* shown in FIG. 3B and the first video data C1video 205*v* shown in FIG. 3D, as well as information (first video/first audio synchronizing data) shown in FIG. 3C for synchronizing a timing for reproducing those data.

The Caudio (first audio data) 205*a* shown in FIG. 3B includes audio data packets A1, A2, A3, . . . . These packets may comprise reproduction timing information, for example, a presentation time stamp (PTS). The reproduction timing information may include an amount of delay in relative reproduction timing among packets which constitute the data. Alternatively, it may be information that describes an absolute reproduction timing of a packet. In this figure, the C1audio 205*a* are shown along PTSs of the packets (with the horizontal axis be as timings indicated by the PTSs).

Similarly, the C1video 205*v* shown in FIG. 3D includes video data packets V1, V2, V3, . . . . These packets also can have PTSs similar to the C1audio 205*a*. In this figure, like the C1audio 205*a*, C1video is shown with the horizontal axis be the PTSs.

For example, in case that the content data is configured in accordance with the MPEG scheme, further to secure synchronization of reproductions of pieces of data such as audio data and video data, a synchronization data packet including first video/first audio synchronization data such as a system clock reference (SCR) value and a program clock reference (PCR) value can be added and used to synchronize a video with a audio. In FIG. 3D, the PCR is illustrated as an example of those data. The PCR includes packets such as CV1, CA1, CV2, CA2, . . . . It is to be noted that CA1, CA2, . . . are synchronization data packets including first audio data base time values that provide bases for reproduction timings of the C1audio (first audio data) 205*a*. CV1, CV2 are synchronization data packets including first video data base time values that provide bases for reproduction timings of the C1video (first video data) 205*v*. These base time values are referenced in the reception facility. Utilizing the base time values, the reception facility adjusts the clock signal generator of the reception facility, which provides a basis for determination of reproduction timings, correlates the base time values with reproduction timing information included in audio data packets or video data packets, and determines reproduction timings.

The first content data 205 including these packetized data constitutes a data string (e.g., MPEG-2 program stream (PS)). By multiplexing them with other PSs, it is possible to constitute a data string including a plurality of content data (e.g., MPEG-2 transport stream (TS)).

<<Configuration of Data Stream Generating Section 209>>

FIG. 4 is a detailed block diagram of the data stream generating section 209, which generates a data stream (data string to be delivered to one or more delivery destinations (hereinafter, also referred to as a delivery data stream)) from content data such as those shown in FIGS. 3A, 3B, 3C, and 3D. Furthermore, FIG. 5 is a flowchart of a process for delivering video/audio data according to this embodiment.

As shown in FIG. 4, the data stream generating section 209 has an A/V separating section 401 for separating audio data (A) and video data (V) of a content data stored in the storage section 203 into separate a audio data and a video data and a synchronization signal inserting section 405 which inserts a synchronization signal at an appropriate timing into at least one of the separated audio data and video data to generate a delivery data stream. Furthermore, the data stream generating section 209 may have a clock signal generating section (CLK) 407 for generating a clock signal. The A/V separating section 401 and the synchronization signal inserting section 405 can perform processes in accordance with a command from the control section 201.

<<Example of Generating and Delivering Delivery Data Stream>>

The following will describe operations related to generation of a delivery data stream by the data stream generating section 209 and delivery of the delivery data stream by the data stream delivering section 211, with reference to a flowchart shown in FIG. 5.

Using a situation as an example where contents are delivered as shown in FIG. 6, these operations are described. In the situation shown in FIG. 6, it is supposed that a passenger who sits on the seat Sb appreciates the first content and another passenger who sits on a seat Sc appreciates the second content. It is similarly supposed that a passenger who sits on the seat Sd appreciates the third content. It is to be noted that the first content includes audio information and video information. Similarly, the second and third contents also include audio information and video information, respectively.

Under the control of the control section 201, the first content data 205, the second content data 207, and the third content data (not shown in FIG. 2) are sent to the A/V separating section 401 of the data stream generating section 209 from the storage section 203.

When receiving these three content data, the A/V separating section 401 separates the first, second, and third content data into the first audio data 205a and the first video data 205v, the second audio data 207a and the second video data 207v, and third audio data and third video data, respectively (step S501).

Each of The video data and the audio data thus separated from each other are to be included in delivery data streams for delivery destinations. Next, generation of the delivery data stream is described. It is to be noted that, in the situation shown in FIG. 6, the first video data 205v is to be sent to the first receiver 111a in the seat Sa. Similarly, the first audio data 205a and the second video data 207v are to be sent to the second receiver 111b in the seat Sb, the second audio data 207a and the third video data are to be sent to a third receiver 111c in the seat Sc, and the third audio data is to be sent to a fourth receiver 111d in the seat Sd. The following will describe generation and delivery of a delivery data stream in the situation shown in FIG. 6.

The control section 201 controls the above-described separation and transfer of the separated data to the synchronization signal inserting section 405 done by the A/V separating section 401. Hence the control section 201 can always recognize the type of data which is sent to the synchronization signal inserting section 405, i.e. video data or audio data, and the content in which each of the data is included and an amount of data of each type of data transferred from the A/V separating section 401. In this case, the amount of each data may be, for example, an amount of data after the last insertion of the synchronization signal by the synchronization signal inserting section 405.

The control section 201 always controls and monitors the data transfer to the synchronization signal inserting section 405 from the A/V separating section 401, and identifies a type of the transferred data (step S503). If the transferred data is video data ("Video data" at step S503), the control section 201 decides whether it is a timing to insert a synchronization data for the video data (step S505). When the control section 201 decides that the synchronization data is to be inserted ("YES" at step S505), the synchronization signal inserting section 405 generates a synchronization data for the video data, then the synchronization data is transferred to the data stream delivering section 211 and is delivered therefrom (step S507). After the delivery of the synchronization data, the video data is also delivered from the data stream delivering section 211 (step S509).

When the control section 201 decides that the insertion of a synchronization data is not necessary ("NO" at step S505), the step S507 is skipped and the video data is transferred to the data stream delivering section 211 and is delivered therefrom (step S509). It is to be noted that the decision by the control section 201 at step S507 might as well be made based on an appropriate criterion such as an amount of data transferred after the last insertion of a synchronization signal or a lapse of time since the last insertion of a synchronization signal. The amount and the lapse are both recognized by the control section 201.

<<Process Related to the Video Data of the First Content>>

In the case of "YES" at step S505, in response to a command from the control section 201, the synchronization signal inserting section 405 creates a first video data base time value serving as an absolute base time for a reproduction timing of the first video data 205v, based on the clock signal from the clock signal generator 407, reproduction timing data such as a PTS etc. included in the first video data 205v, and a synchronization data such as an SCR or a PCR included in the first content data. Then, the synchronization signal inserting section 405 creates a first video synchronization data (video synchronization data to be delivered to the first receiver, that is, the receiver 111a) which includes a packet in which the first video data base time value is written, and transfers it to the data stream delivering section 211. It is to be noted that, at this step, it is not indispensable to utilize the clock signal generated by the clock signal generator 407 in the creation of the base time value. The first video synchronization signal may be created by utilizing only synchronizing data (e.g., SCR or PCR) stored in the storage section 203. Hence the clock signal generator 407 can be omitted.

After the transfer of the synchronization data to the data stream delivering section 211 at step S507, the first video data 205v are transferred to the data stream delivering section 211. The transferred first video synchronization data is delivered from the data stream delivering section 211 (step S507) and the first video data 205v is also delivered from the data stream delivering section 211 (step S509). As is clear from the flowchart, when the flow on the video data proceeds to "NO" at the step S505, the synchronization data is not delivered immediately before the delivery of the video data from the data stream delivering section 211 (step S509).

Concurrently with the above-described process on the first video data 205v, processes on other audio data and video data are performed (steps S503 and S505, and steps S503 and S511).

<<Process Related to the Audio Data of the First Content>>

(In the case of "YES" at step S511), in response to a command from the control section 201, the synchronization signal inserting section 405 creates a first audio data base time value serving as an absolute base time for a reproduction timing of the first audio data 205a, based on a clock signal from the clock signal generator 407, the first video data base time value, a reproduction timing data such as a PTS etc. included in the first audio data 205a, and a synchronization data such as an SCR or a PCR included in the first content data. The first audio data base time value defines an absolute time of a reproduction timing of the first audio data 205a using the same reference time axis as that of the first video data base time value. Therefore, by means of this first audio data base time value and the above-described first video data base time value, the two reproduction timings which are indicated by the two pieces of timing data such as PTSs etc. included in the first video data 205v and first audio data 205a are respectively defined on (connected with) the reference time axes, both of which have identical scales. In response to a command from the control section 201, the synchronization signal inserting section 405 creates a first audio synchronization data (audio synchronization data to be delivered to the second receiver, that is, the receiver 111b) which includes a packet in which the first audio data base time value is written, and transfers it to the data stream delivering section 211. Then, the first audio data 205a are transferred to the data stream delivering section 211. The transferred first audio synchronization data is delivered from the data stream delivering section 211 (step S513) and then the first audio data 205a is also delivered from the data stream delivering section 211 (step S515). As is clear from the flowchart, when the flow on the audio data proceeds to "NO" at the step S511, the synchronization data is not delivered immediately before the delivery of the audio data from the data stream delivering section 211 (S515).

<<Process Related to the Video Data of the Second Content>>

Furthermore, similar to the process related to the first video data 205v, in response to a command from the control section 201, the synchronization signal inserting section 405 creates a second video data base time value serving as an absolute base time for a reproduction timing of the second video data 207v, based on the clock signal from the clock signal generator 407, a reproduction timing data such as a PTS etc. included in the second video data 207v, and a synchronization data such as an SCR or a PCR included in the second content data. Moreover, the synchronization signal inserting section 405 creates a second video synchronization data (video synchronization data to be delivered to the second receiver, that is, the receiver 111b) which includes a packet in which the second video data base time value is written, and transfers it to the data stream delivering section 211. Then, the second video data 207v are transferred to the data stream generating section 211. The transferred second video synchronization data is delivered from the data stream delivering section 211 (step S507) and the second video data 207v is also delivered from the data stream delivering section 211 (step S509). As is clear from the flowchart, when the flow for the video data proceeds to "NO" at step S505, the synchronization data is not delivered immediately before the delivery of the video data from the data stream delivering section 211 (step S509).

It is to be noted that the first video/audio data base time values and the second video/audio data base time values may be created based on reference time axes which have identical time scales and/or identical absolute values, or may be created based on respective reference time axes which have different time scales and/or different absolute values from each other. That is, the present invention does not define a relationship between an i-th video/audio data base time value (i: natural number) and a j-th video/audio data base time value (j: natural number other than i) at all. They may have an arbitrary relationship.

<<Process Related to the Audio Data of the Second Content>>

Furthermore, similar to the process related to the first audio data 205a, in response to a command from the control section 201, the synchronization signal inserting section 405 creates a second audio data base time value serving as an absolute base time for a reproduction timing of the second audio data 207a based on a clock signal from the clock signal generator 407, a second video data base time value, a reproduction timing data such as a PTS included in the second audio data 207a, and a synchronization data such as an SCR or a PCR included in the second content data. This second audio data base time value defines an absolute time of a reproduction timing of the second audio data 207a on a reference time axis having the identical scale to the scale of the second video data base time value. Therefore, this second audio data base time value and the above-described second video data base time value define reproduction timings each of which is indicated by the reproduction timing data such as a PTS included in the second video data 207v or second audio data 207a on reference time axes both of which have identical scales. In response to a command from the control section 201, the synchronization signal inserting section 405 creates a second audio synchronization data (audio synchronization data to be delivered to the third receiver, that is, the receiver 111c) including a packet in which this second audio data base time value is written, transfers it to the data stream delivering section 211, and then transfers the second audio data 207a to the data stream delivering section 211. The transferred second audio synchronization data is delivered from the data stream delivering section 211 (step S513) and the second audio data 207a is also delivered from the data stream delivering section 211 (step S515). As is clear from the flowchart, when the flow for the audio data proceeds to "NO" at step S511, the synchronization data is not delivered immediately before the delivery of the audio data from the data stream delivering section 211 (step S515).

<<Process Related to the Video Data of the Third Content>>

Still furthermore, similar to the process related to the first and second video data 205v and 207v, in response to a command from the control section 201, the synchronization signal inserting section 405 creates a third video data base time value serving as an absolute base time for a reproduction timing of the third video data based on a clock signal from the clock signal generator 407, a reproduction timing data such as a PTS included in the third video data, and a synchronization data such as an SCR or a PCR included in the third content data, creates a third video synchronization data (video synchronization data to be delivered to the third receiver, that is, the receiver 111c) including a packet in which the third video data base time value is written, transfers it to the data stream delivering section 211, and then transfers the third video data to the data stream delivering section 211. The transferred third video synchronization data is delivered from the data stream delivering section 211 (step S507) and the third video data 207v is also delivered from the data stream delivering section 211 (step S509). As is clear from the flowchart, when the flow for the video data proceeds to "NO" at step S505, the synchronization data is not delivered immediately before the delivery of the video data from the data stream delivering section 211 (step S509).

<<Process Related to the Audio Data of the Third Content>>

Finally, similar to the process related to the first and second video data 205v and 207v, in response to a command from the control section 201, the synchronization signal inserting section 405 creates a third audio data base time value serving as an absolute base time for a reproduction timing of the third audio data based on a clock signal from the clock signal generator 407, the third video data base time value, a reproduction timing data such as a PTS included in the third video data of third delivery video/audio data, and a synchronization data such as an SCR or a PCR included in the third content data, creates a third audio synchronization data (audio synchronization data to be delivered to the fourth receiver, that is, the receiver 111d) including a packet in which the third audio data base time value is written, transfers it to the data stream delivering section 211, and then transfers the third audio data to the data stream delivering section 211. The transferred third audio synchronization data is delivered from the data stream delivering section 211 (step S513) and the third audio data is also delivered from the data stream delivering section 211 (step S515). As is clear from the flowchart, when the flow for the audio data proceeds to "NO" at step S511, the synchronization data is not delivered immediately before the delivery of the audio data from the data stream delivering section 211 (step S515)

Each data stream thus configured is sent to the access point 105 from the data stream delivering section 211 (steps S507, S509, S513, and S515). It is to be noted that the first data stream includes the first video data and the first video synchronization data. The second data stream includes the first audio data and the first audio synchronization data as well as the second video data and the second video synchronization data. The third data stream includes the second audio data and the second audio synchronization data as well as the third video data and the third video synchronization data. The fourth data stream includes the third audio data and the third audio synchronization data.

The first, second, third, and fourth data streams are received at the first, second, third, and fourth receivers 111a-111d through the wireless transmission channel, respectively.

<<Utilization of RTP and RTCP Protocols>>

When using the Internet in the delivery of above mentioned data, the data stream delivering section 211 can convert these data streams into RTP packets and deliver these RTP packets in accordance with the UDP or TCP/IP protocol through the access point 105 to the receivers 111a-111d, respectively. It is to be noted that it is possible to assign a predetermined number to a port number in advance, which is used to identify a type of data and a type of a data stream, or is possible to determine a port number after a negotiation of the receiver with the transmission server when the reception of a content started. It is further possible for the transmission server 101 and the receivers 111a-111d to exchange RTCP packets (a sender report and a receiver report) with each other periodically.

The RTP packet can have a timestamp at its header so that the receivers can reproduce the data synchronously. In the present embodiment, this packet can be used for a synchronous reproduction of a video data or an audio data (i.e., used for a definition of relative delay time in reproduction timings of data included in the audio or video data). A format of the RTP data packet is shown below.

TABLE 1

| V | P | X | CC | M | PT | Sequence Number |
|---|---|---|----|---|----|-----------------|
| Timestamp | | | | | | |
| SSRC | | | | | | |
| Payload data | | | | | | |

Format of an RTP Data Packet

A sender report (SR) of an RTCP has a network time protocol (NTP) and can be utilized together with the above-described timestamp to synchronize a video data with other video data, an audio data with other audio data, or a video data with an audio data. In this case, the synchronization signal is delivered in accordance with another protocol (RTCP), which differs from that for the audio data and/or video data (RTP packet), as an NTP in the SR of the RTCP to provide the receivers with absolute time information and a correlation between the information and a timing described in a timestamp. By recording a timestamp correlated with the NTP in an RTP packet of each data, it is possible to output an audio and a video synchronously. Hence, it is not necessary to multiplex synchronization signals with each delivery data stream. Synchronization signals are delivered to each receiver by an SR of the RTCP. Each receiver might as well reproduce each data using the NTP in the SR of the RTCP and the timestamp correlated with the NTP in the RTP packet. A format of the RTCP SR packet is shown below.

TABLE 2

| V | P | IC | PT | Length |
|---|---|----|----|--------|
| SSRC | | | | |
| NTP timestamp | | | | |
| RTP timestamp | | | | |
| Packet count on sender side | | | | |
| Octet count on sender side | | | | |

Format of an RTCP SR Packet

Further, it is also possible for each of the receivers to send information on jitters etc. in communication to the transmission server 101 by using an RTCP receiver report (RR) and notify the transmission server 101 of data delivery conditions, thereby the data delivery conditions are improved.

<Operation to Reproduce a Data Stream>

Figure 7:
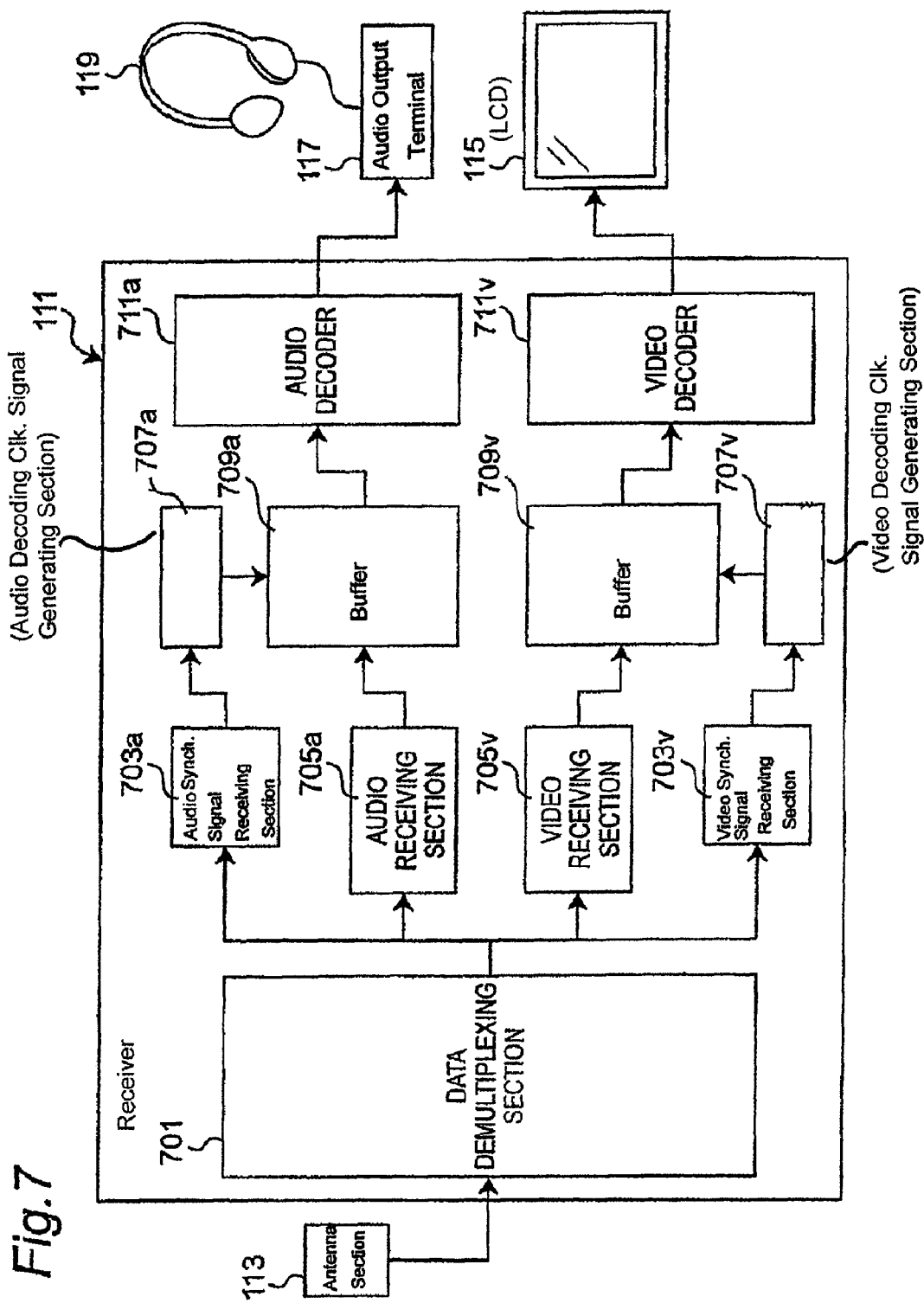
FIG. 7 is a block diagram of a receiver according to the first embodiment.

FIG. 7 is a block diagram of a receiver 111 of the reception facility. The receiver 111 has the same configuration as the receivers 111a-111d.

Data received by an antenna section 113 is sent to the receiver 111. Then, the receiver 111 analyzes a header of the data to confirm that the data was delivered to the receiver 111 and transfers the received data to a data demultiplexing section 701.

The data demultiplexing section 701 analyzes the received data to demultiplex it to an audio synchronization signal packet including an audio synchronization signal, an audio data packet including audio data, a video data packet including video data, and a video synchronization signal packet including a video synchronization signal.

The audio synchronization signal packet is transferred to an audio synchronization signal receiving section 703a, the audio data packet is transferred to an audio receiving section 705a, the video data packet is transferred to a video receiving section 705v, and the video synchronization signal packet is transferred to a video synchronization signal receiving section 703v.

Below, the reproduction of the audio data packet is described. The audio data packet is transferred to a buffer 709a from the audio receiving section 705a and stored therein temporarily.

On the other hand, the audio synchronization signal packet is sent to an audio decoding clock signal generating section 707a, which in turn adjusts a clock signal based on the audio synchronization signal packet and sends the clock signal to the buffer 709a appropriately.

Based on the received clock signal, the buffer 709a sends the temporarily stored audio data packet to an audio decoder 711a at an appropriate timing by using information on a reproduction timing indicated in the audio data packet.

When having received the audio data packet, the audio decoder 711a decodes the audio data packet to create an audio signal and sends the created audio signal to an audio output terminal 117. The audio signal is reproduced from a headphone 119 as audio information.

Simultaneously with the reproduction of this audio data packet, the receiver 111 reproduces the video data packet. The video data packet is transferred to a buffer 709v from a video receiving section 705v and stored therein temporarily.

The video synchronization signal packet is transferred to a video decoding clock signal generating section 707v, which in turn adjust a clock signal based on the video synchronization signal packet and sends the clock signal to the buffer 709v appropriately.

Based on the received clock signal, the buffer 709v transfers the temporarily stored video data packet to a video decoder 711v at an appropriate timing by using information on a reproduction timing indicated in the video data packet.

When having received the video data packet, the video decoder 711v decodes the video data packet to create a video signal and sends the created video signal to an LCD 115. The video signal is reproduced from the LCD 115 as video information.

In such a manner, the receivers decode and reproduce audio data and video data.

FIG. 8 is a schematic diagram of reproduction timings of audio data and video data by the second and the third receivers 111b and 111c in the example of FIG. 6. In the following, with reference to FIG. 8, it will be described how the synchronization between separate receivers is secured.

The second receiver 111b reproduces a first audio by using a first audio synchronization signal packet 801 and a first audio data packet 803 and, simultaneously, reproduces a second video by using a second video synchronization signal packet 805 and a second video data packet 807.

In the second receiver 111b, the first audio synchronization signal packet 801 provides a time on a reference time axis T1 and information (arrows in the figure) which correlates the time of the reference time axis T1 with a reproduction timing of at least one packet of the first audio data packet 803. An interval between relative reproduction timings of the one packet of the first audio data packets 803 and others of the first audio data packet 803 is adjusted using reproduction timing data included in each of the first audio data packets 803. The second video synchronization signal packet 805 provides a time of a reference time axis T2 and information (arrows in the figure) which correlates the time of the reference time axis T2 with a reproduction timing of at least one packet of the second video data packet 807.

On the other hand, in the third receiver 111c, the second audio synchronization signal packet 809 provides a time on a reference time axis T2 and information (arrows in the figure) which correlates the time of the reference time axis T2 and a reproduction timing of at least one packet of the second audio data packet 811. An interval between relative reproduction timings of the one packet of the second audio data packets 811 and others of second audio data packet 811 is adjusted in the same manner as in the receiver 111b. The third video synchronization signal packet 813 provides a time on a reference time axis T3 and information (arrows in the figure) which correlates the time of the reference time axis T3 and a reproduction timing of at least one packet of the third video data packet 815.

It is thus possible to secure perfect synchronous reproduction between video reproduction in the second receiver 111b and audio reproduction in the third receiver 111c. Such perfect synchronous reproduction can be secured similarly in other receivers.

As mentioned above, the reference time axes T1, T2, and T3 may be identical to or different from each other.

Although the present embodiment is described using an example wherein the digital data delivery system according to the present invention is used as an information system in passenger transport facilities such as an airplane, the passenger transport facilities are not limited to the airplane. For example, the present invention may be used by equipping the receiver in a seat of a train, a ship, or an automobile. Further, the present invention is not limited to use in the passenger transport facilities. Furthermore, use of the receiver is not limited to an aspect wherein the receiver is equipped in the seat.

Second Embodiment

Similar to the first embodiment, the present embodiment is an information system in a passenger room of an airplane which uses the digital data delivery system according to the present invention.

In the system according to the first embodiment, the transmission server of the transmission facility can deliver at least one of an audio and/or video of a content to each of a plurality of receivers by receiving and responding a request such as a viewing request from a receiver side, for example. In contrast, in the system of the present embodiment, a transmission server delivers one or more contents to one or more receivers, and each of the receivers receives data of the one or more contents and selectively reproduces at least one of the video and/or the audio of the one or more contents.

In other words, the transmission server delivers data of a video and/or a audio to a plurality of receivers in accordance with the multicast scheme, and the receivers in turn selectively reproduce only necessary data from a plurality of pieces of audio and video data of one or more contents included in the received data. According to the system of the present embodiment, it is possible to selectively and synchronously reproduce a pair of a video data and an audio data constituting one content with a plurality of receivers from a plurality of content data delivered to those receivers from the transmission server.

In the following, the present embodiment is described while omitting description of the same components and operations as those of the first embodiment. In addition, components indicated by the same reference numerals as those already used in other figures are supposed to be identical to those components.

Figure 9:
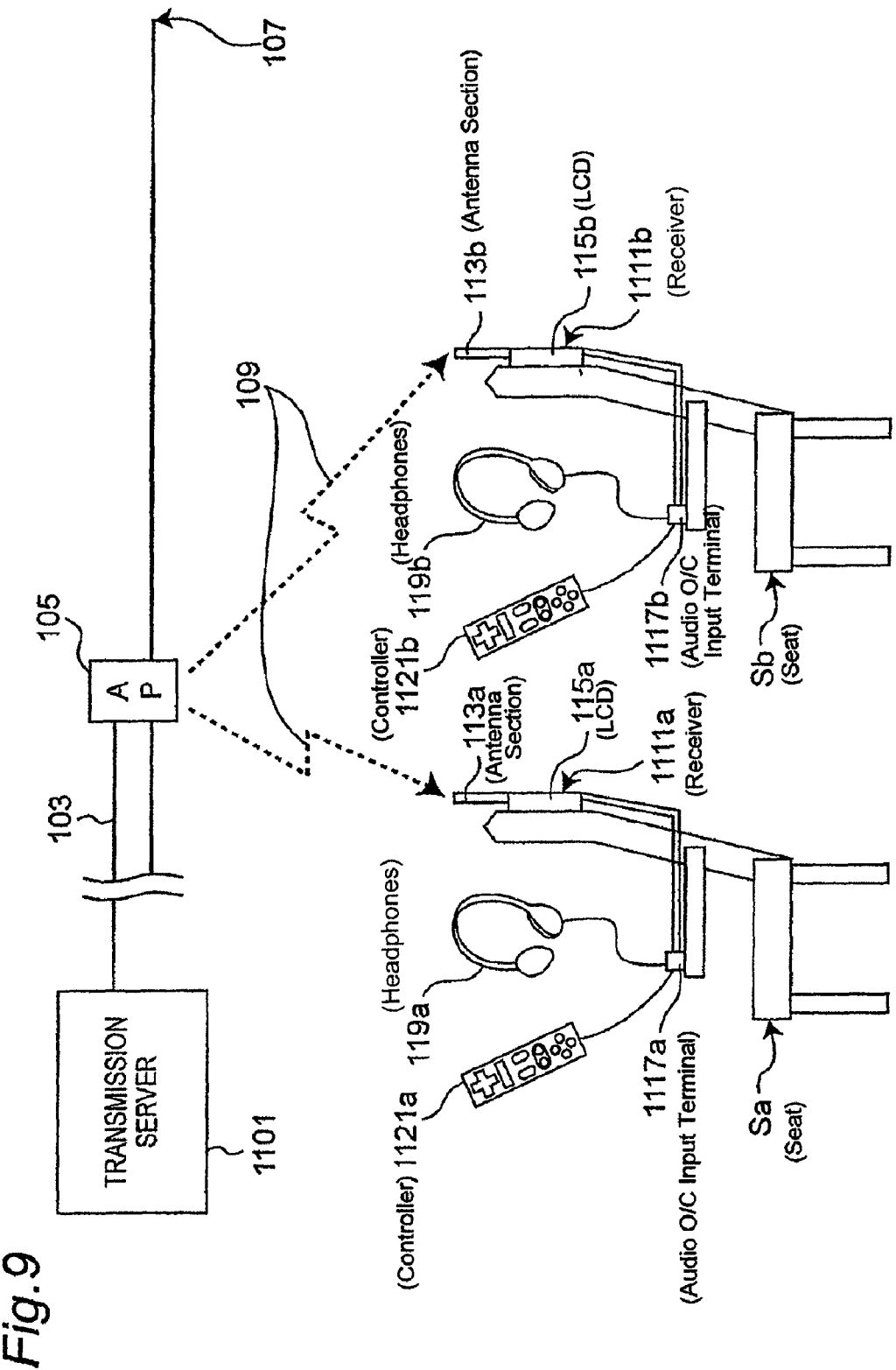
FIG. 9 is a schematic diagram of a configuration of a digital data delivery system according to a second embodiment.

FIG. 9 is a cross-sectional side view of a part of an airplane passenger room in which a digital data delivery system according to the present embodiment is equipped.

<Outline of Transmission Facility Configuration>

A transmission facility includes a transmission server 1101 and an access point 105, which is a radio-wave repeater. The transmission server 1101 has similar functions to the functions of the transmission server 101 according to the first embodiment. In addition, the transmission server 1101 has functions to appropriately create a program table (contents reference table), which is information about contents to be delivered, to store the program table, to update the program table, and to deliver the program table to a reception facility.

A data stream delivered by the transmission server 1101 is sent to the access point 105 via a wired transmission channel 103. The access point can deliver the data to the reception facility. Further, the access point 105 can relay data communications between individual receivers included in the reception facility.

<Outline of Reception Facility Configuration>

The reception facility includes first and second receivers 1111a and 1111b each of which is built into seats Sa and Sb respectively. The first and second receivers 1111a and 1111b have antenna sections 113a and 113b, LCDs 115a and 115b, audio output/controller input terminals 1117a and 1117b, headphones 115a and 115b, and controllers 1121a and 1121b, respectively. In the present embodiment, the number of the seats is not limited to two. If an airplane's passenger room has three seats or more, the present system can be equipped with the third receiver or more receivers etc.

The first and second receivers 1111a and 1111b have similar functions to the receiver 111a etc. according to the first embodiment. In addition, the first and second receivers 1111a and 1111b have functions to selectively reproduce audio data and video data contained in received data based on inputs from controllers 1121a and 1121b, to send the inputs from the controllers 1121a and 1121b to other receivers, to receive information about the inputs in other controller from the other receiver, and to receive, store, update, and appropriately reference the contents reference table delivered from the transmission server 1101.

<Configuration of Transmission Server 1101>

Figure 10:
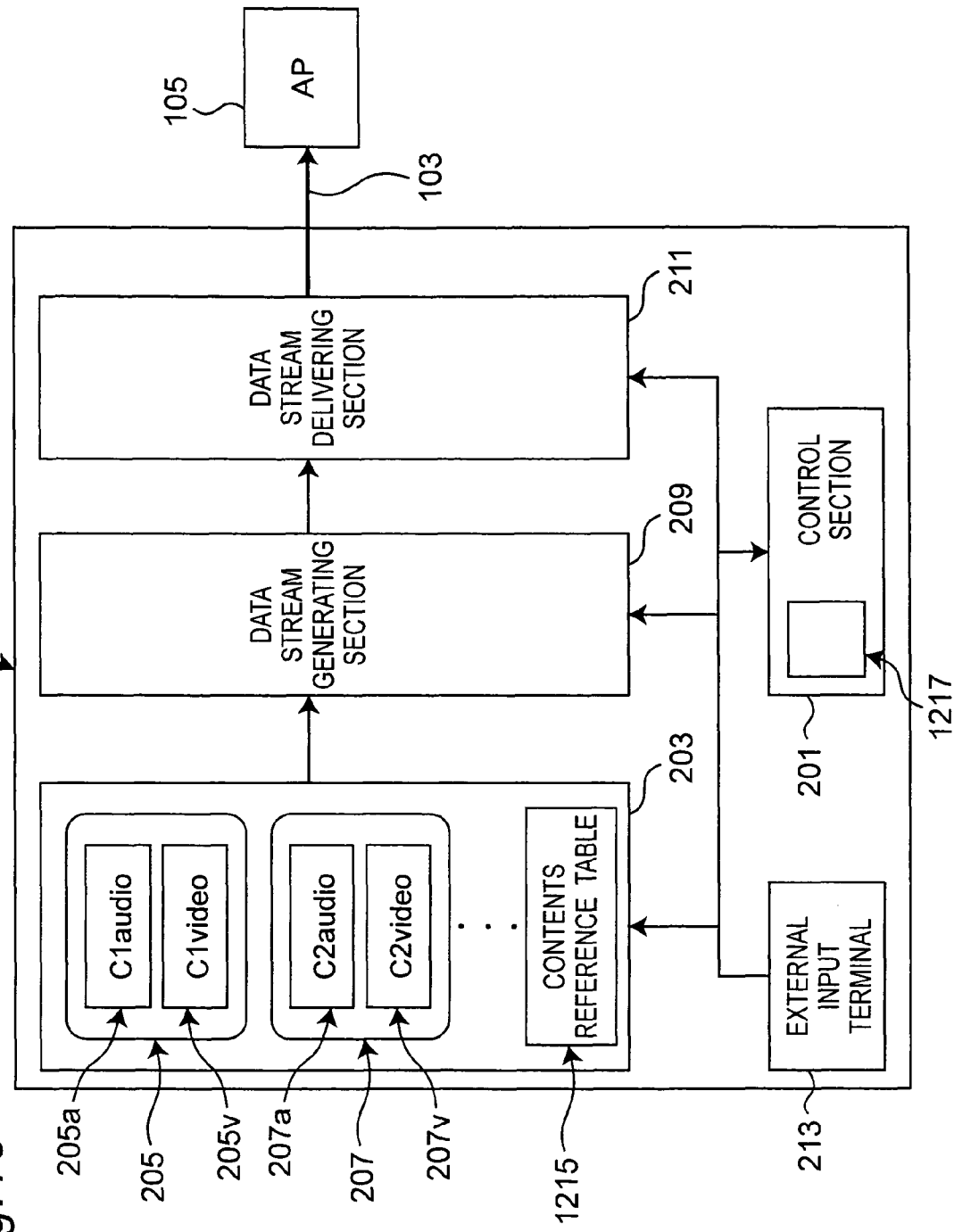
FIG. 10 is a block diagram of a transmission facility according to the second embodiment.

FIG. 10 is a block diagram of the transmission server 1101. Like the transmission server 101 of the first embodiment, the transmission server 1101 has a control section 201, a storage section 203, a data stream generating section 209, and a data stream delivering section 211. Furthermore, the control section 201 comprises a contents reference table generating section 1217 that can create, store in the storage section 203 and appropriately update the contents reference table, and deliver the stored contents reference table to the receiver.

<<Example of Contents Reference Table>>

The following table "Contents Reference Table" is an example of a contents reference table 1215 created by the contents reference table generating section 1217 in the control section 201 and stored in the storage section 203.

TABLE 3

Contents Reference Table

| Program name | Multicast address | Video port No. | Video synchronization port No. | Audio port No. | Audio synchronization port No. |
|---|---|---|---|---|---|
| 1st content | 239.192.3.1 | 52002 | 52003 | 53002 | 53003 |
| 2nd content | 239.192.3.2 | 52006 | 52007 | 53006 | 53007 |
| 3rd content | 239.192.3.3 | 52010 | 52011 | 53010 | 53011 |

This table gives an example of the contents reference table that is created and stored when the transmission server 1101 delivers three contents to each receiver (host) according to the multicast scheme. As is clear from this table, the transmission server 1101 can deliver each of the contents to different multicast addresses. Further, port numbers used by a video data, a video synchronization signal data, an audio data, and an audio synchronization signal data included in the contents are different within one content and also between the contents also. The contents reference table generating section 1217 can generate data that correlates the video data, the video synchronization data, the audio data, or the audio synchronization data etc. with an address and a port number used in delivery of the data and store the generated data as the contents reference table 1215 in the storage section 203. Further, if the content to be delivered is changed, the contents reference table generating section 1217 can update the data anytime. When multicast service starts, the transmission server 1101 can deliver data of the information of the content reference table to a specific multicast address using a specific port. This data might as well be delivered in an appropriate format by using a predetermined protocol. Further, if the data is updated, the updated data can be delivered anytime.

It is to be noted that the contents reference table may be stored in each of the receivers as a fixed data table. In this case, the contents reference table generating section 1217 can be omitted, so that it is unnecessary to store the contents reference table in the storage section 203.

<Operations for Generating Data Stream>

In the present embodiment, the transmission server 1101 generates a data stream based on one or more contents data stored in the storage section 203 as in the case of the transmission server 101 of the first embodiment. Each content data is sent to the data stream generating section 209, which in turn separates the received content data into an audio data, a video data, and other control data to create an audio data, an audio synchronization data, a video data, and a video synchronization data and inserts the audio synchronization data into the audio data (stream) at an appropriate timing and the video synchronization data into the video data (stream) at an appropriate timing.

<Example of Delivery of a Data Stream>

Delivery of a data stream by the transmission server 1101 is described with reference to an example where three contents are delivered using the multicast scheme as described in the above mentioned "contents reference table."

It is supposed that an audio data and a video data of a first content are referred to as a first audio data and a first video data, a synchronization signal data of the first audio data and that of the first video data are referred to as a first audio synchronization data and a first video synchronization data. Similar terms are assigned also to the second and third contents.

The data stream delivering section 211 delivers a data packet of the first video data, which is data of a video of the first content, to a multicast address 239.192.3.1 (first multicast address) by using a port of number 52002 (first video port No.) and delivers the first video synchronization data to the first multicast address by using a port of number 52003 (first video synchronization port No.).

Also for an audio data, similarly, the data stream delivering section 211 delivers a data packet of the first audio data to the first multicast address by using a port of number 53002 (first audio port No.) and delivers the first audio synchronization data to the first multicast address by using a port of number 53003 (first audio synchronization port No.).

Similarly, the data stream delivering section 211 also delivers data of the second content and data of the third content to their respective multicast addresses by using different numbered ports for each of the data.

<Operations for Reproducing Data Stream>

<<Selection of a Content to be Reproduced>>

Figure 11:
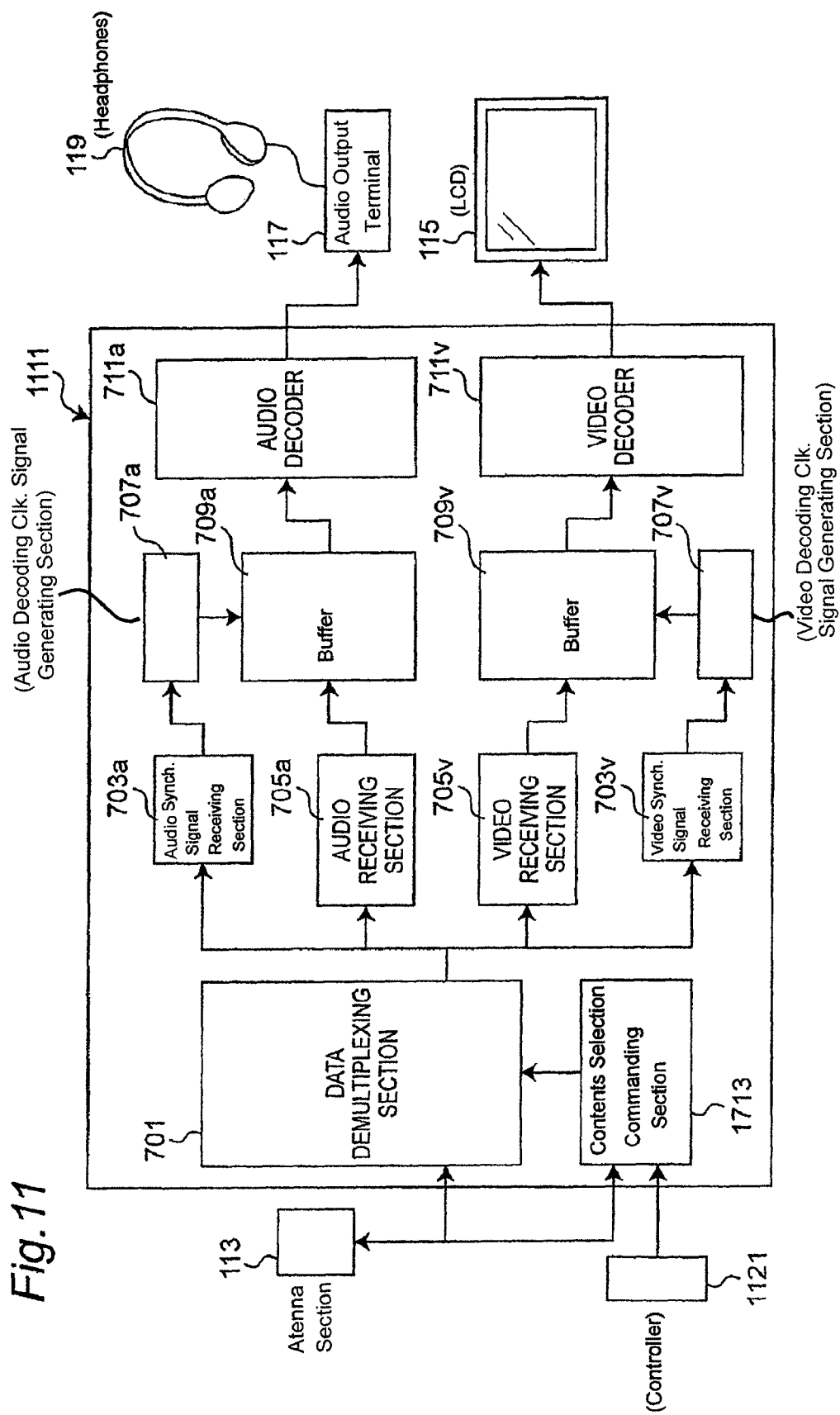
FIG. 11 is a block diagram of a receiver according to the second embodiment.

FIG. 11 is a block diagram of a receiver 1111 according to the present embodiment. The receiver 1111 has the same configuration as the receiver 1111a etc. shown in FIG. 9. The receiver 1111 has components substantially same as those of the receiver 111 in the first embodiment and additionally has a content selection commanding section 1713.

The contents selection commanding section 1713 can receive an input from a controller 1121, output a signal based on the input from the controller 1121 to a data demultiplexing section 701, and, via the antenna section 113, receive data about a contents reference table delivered from the transmission server 1101, send data based on the input from the controller 1121 to other receivers, and receive data which is based on an input from another controller connected with another receiver from the another receiver.

The first and second receivers 1111*a* and 1111*b*, which are hosts belonging to one multicast group, can receive a contents reference table from the transmission server 1101 when a multicast service by the transmission server 1101 starts.

A method for delivering and acquiring the contents reference table (program delivery information) is not limited to a downloading of data when the multicast service starts. The receivers might as well always monitor specific multicast addresses and ports to create and update the contents reference table based on data of data packets delivered using these port numbers. For example, the data can have a format compliant with, for example, a session description protocol (SDP). The SDP might as well be transmitted periodically from the transmission server 1101 to receivers, which are hosts belonging to one multicast group, by using a predetermined protocol.

It is to be noted that, as described above, the content selection commanding section 1713 may be configured such that the section 1713 can store a fixed contents reference table. In this case, it is not indispensable that the content selection commanding section can receive data about the contents reference table from the transmission server 1101 via the antenna section 113.

Figure 12:
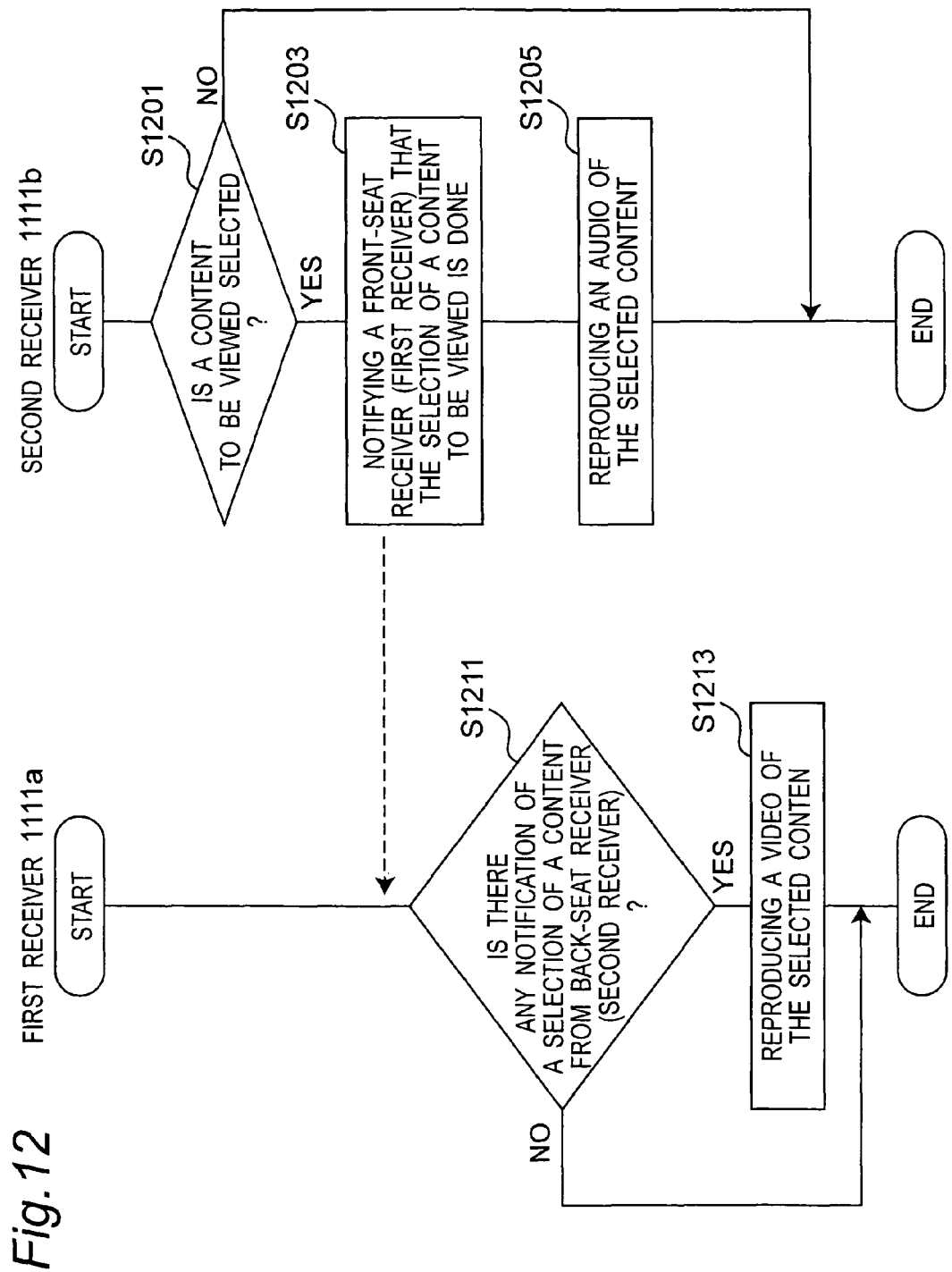
FIG. 12 is a flowchart of a process after a selection of one content is done in one receiver: the process includes notifying the selection to other receiver; and reproducing a video of the selected content in the other receiver.

FIG. 12 is a flowchart of a processes performed by the first and second receivers 1111*a* and 1111*b* when a passenger selects a content with the controller 1121.

For example, a passenger who sits on the seat Sb (see FIG. 9) can select a content he wants to view, with the controller 1121*b* equipped to the seat. In the following, the processing related to a reproduction of a content performed by the first and second receivers 1111*a* and 1111*b* is described with illustrative case where a second content is selected by the passenger who sits on the seat Sb.

<<Switchover of Reproduction Video when a Content is Selected>>

The content selection commanding section 1713 of the second receiver 1111*b* monitors an input from the connected controller 1121*b* (step S1201).

If the passenger selects to view the second content by using the controller 1121*b* ("YES" at step S1201), the content selection commanding section 1713 notifies the receiver (first receiver 1111*a*) in the front seat through the access point 105 that viewing of the second content has been selected in the second receiver 1111*b*.

The content selection commanding section of the second receiver 1111*b* sends information on an audio data and an audio synchronization signal data to be demultiplexed to the data demultiplexing section (701) of the second receiver 1111*b*. That is, the content selection commanding section sends a command to the data demultiplexing section for controlling a handling of packets such that the data delivered to the second multicast address using the second audio port number is demultiplexed to the audio data and the demultiplexed audio data is transferred to an audio receiving section (705*a*) and the data delivered to the second multicast address using the audio synchronization port number to the audio synchronization signal data and the demultiplexed audio synchronization signal data is transferred to an audio synchronization signal receiving section (703*a*) (step S1205). This makes the second receiver 1111*b* hereinafter reproduce an audio of the second content.

On the other hand, the content selection commanding section 1713 of the first receiver monitors an input of a notification from the receiver (second receiver 1111*b*) in the back seat (step S1211).

When the first receiver 1111*a* receives the notification of the selection of a content from the second receiver 1111*b* ("YES" at step S1211), the content selection commanding section of the first receiver 1111*a* sends information on video data and video synchronization signal data to be demultiplexed to the data demultiplexing section 701 of the first receiver 1111*a*. That is, the content selection commanding section sends a command for controlling a handling of packets such that the data delivered to the second multicast address using the second video port number is demultiplexed to the video data and the demultiplexed video data is transferred to a video receiving section (705*v*) (of the first receiver) and the data delivered to the second multicast address using the video synchronization port number to the video synchronization signal data and the demultiplexed video synchronization signal data is transferred to a video synchronization signal receiving section (703*v*) (of the first receiver) (step S1213). This makes the first receiver 1111*a* hereinafter reproduce a video of the second content.

It is to be noted that the notification on the selection of a content given by a receiver to other receivers is given by using a predetermined port. Each of the receivers may always monitor data sent using predetermined port number; thereby the receivers can recognize the notification of a change of the content to be reproduced.

As a matter of course, the second receiver 1111*b* can receive a notification on a selection of a content from the third receiver in the back seat to switch a video to be reproduced in the same way as the first receiver 1111*a* does.

In such manner, in the present embodiment, it is possible to select a video and an audio of one content from data of a plurality of contents delivered by the transmission server 1101 and synchronously reproduce them by different receivers.

In both of the first and second embodiments, the digital data delivery systems according to the present invention are described such that a wireless transmission channel is used as a part of a transmission channel for connecting a transmission facility with a reception facility. However, it is not an indispensable requirement for the present invention that the wireless transmission channel should be included at least a part of the transmission channel.

In a case where only a wired transmission channel is used as a transmission channel to connect the transmission facility with the reception facility, it is possible to omit the access point 105 in the transmission facility and the antenna section 113 in each of the receivers 111 or in each of the receivers 1111. The transmission server 101 or 1101 and each receiver 111 or 1111 might as well be connected with each other with the wired transmission channel.

Also in the digital data delivery system according to the present invention that uses a wired transmission channel as a transmission channel, each receiver 111 or 1111 decodes only a data stream to be reproduced and reproduces the decoded data stream. Therefore, unlike conventional systems, it is not necessary for one receiver to receive a data stream (e.g., audio stream), decode it, and then send the decoded information (e.g., audios) back to a different receiver (e.g., receiver in the back seat) via the wired transmission channel. Therefore, the digital data delivery system according to the present invention can make a delay time which occurs between a transmission of data from the transmission server and a reproduction of the data shorter than that occurred in the conventional systems. Therefore, for example, it can reduce a video-on-demand (VOD) response time more than that of-the conventional systems.

The digital data delivery system according to the present invention substantially completely synchronizes a first reproduction timing for reproduction of first data in the first receiver with a second reproduction timing for reproduction of second data in the second receiver without a synchronization between the receivers in the system. The present invention is useful as an information system and the like comprising a transmission facility for digitally delivering at least one of a video signal and an audio signal and a reception facility for receiving the delivered signal.

What is claimed is:

1. A transmission server for digitally delivering a data packet to a receiver through a transmission channel, comprising:
 a generating section that generates (1) a video data packet including digital data of video information of a content and digital data of video reproduction timing information on a timing at which the digital data of video information is reproduced, (2) a video synchronization signal packet including a video synchronization signal which includes a video data reproducing base time value that correlates the video reproduction timing information with a first time on a predetermined reference time axis, (3) an audio data packet including digital data of audio information of the same content and digital data of audio reproduction timing information on a timing at which the digital data of audio information is reproduced, and (4) an audio synchronization signal packet including an audio synchronization signal which includes an audio data reproducing base time value that correlates the audio reproduction timing information with a second time on the predetermined reference time axis; and
 a delivering section that delivers the video data packet and the video synchronization signal packet to a first receiver and delivers the audio data packet and the audio synchronization signal packet to a second receiver without synchronizing a timing of delivering the video data packet and a timing of delivering the audio data packet with each other.

2. The transmission server according to claim 1, wherein
 the video information and the audio information are respectively compressed and encoded according to MPEG standards; and
 the video reproduction timing data is based on a presentation time stamp of the video information and the audio reproduction timing data is based on a presentation time stamp of the audio information.

3. The transmission server according to claim 1, wherein
 said delivering section delivers the video data packet and the audio data packet as RTP packets and delivers the video synchronization signal packet and the audio synchronization signal packet as RTCP packets.

4. The transmission server according to claim 1, wherein
 said delivering section delivers data packets of said content or a plurality of contents which includes said content to said first receiver and said second receiver according to a multicast scheme.

5. The transmission server according to claim 4, further comprising
 a contents reference table generating section that generates a contents reference table which includes information on a method for delivering said content or the plurality of contents, wherein
 said delivering section delivers the contents reference table to said first receiver and said second receiver.

6. The transmission server according to claim 5, wherein
 the contents reference table includes information on at least one of a port number and a multicast address which said delivering section uses for delivering the audio data packet, the audio synchronization signal packet, the video data packet, and the video synchronization signal packet which are included in either one content of said content or the plurality of contents.

7. A receiver for receiving (1) a first video data packet including digital data of video information of a first content, (2) a first video synchronization signal packet including a video synchronization signal for the first video data packet, (3) a second audio data packet including digital data of audio information of a second content, and (4) a second audio synchronization signal packet including an audio synchronization signal for the second audio data packet, all of the first video data packet, the first video synchronization signal packet, the second audio data packet, and the second audio synchronization signal packet are delivered through a transmission channel, comprising:
 a first buffer section that buffers the first video data packet;
 a second buffer section that buffers the second audio data packet;
 a first clock signal generating section that adjusts a clock signal based on the first video synchronization signal packet;
 a second clock signal generating section that adjusts a clock signal based on the second audio synchronization signal packet;
 a first decoder section that reproduces the first video data packet based on video reproduction timing information and a first clock signal generated by said first clock signal generating section; and
 a second decoder section that reproduces the second audio data packet based on audio reproduction timing information and a second clock signal generated by said second clock signal generating section
 wherein (1) the first video data packet further includes digital data of the video reproduction timing information on a timing at which the digital data of video information of the first content is reproduced, the video synchronization signal of (2) the first video synchronization signal packet includes a video data reproducing base time value that correlates the video reproduction timing information with a first time on a first predetermined reference time axis, (3) the second audio data packet further includes digital data of the audio reproduction timing information on a timing at which the digital data of audio information is reproduced, and the audio synchronization signal of (4) the second audio synchronization signal packet includes an audio data reproducing base time value that correlates the audio reproduction timing information with a second time on a second predetermined reference time axis.

8. The receiver according to claim 7, wherein
 not only the first video data packet, the first video synchronization signal packet, the second audio data packet, and the second audio synchronization signal packet which are delivered according to a multicast scheme but also a first audio data packet including digital data of audio information of the first content, a first audio synchronization signal packet including audio synchronization information for the first audio data packet, a second video data packet including digital data of video information of the second content, and a second video synchronization signal packet including video synchronization information for the second video data packet which are also delivered according to the multicast scheme are received, and further comprising a contents selection commanding section that controls a handling of a packet which is included in the received first video data packet, the received first video synchronization signal packet, the received first audio data packet, the received first audio synchronization signal packet, the received second video data packet, the received second video synchronization signal packet, the received second audio data packet, or the received second audio synchronization signal packet and is to be transferred to said first buffer section, said second buffer section, said first clock signal generating section, or said second clock signal generating section so that said first decoder section reproduce the first video data packet based on the first video synchronization signal packet and so that said second decoder section reproduce the second audio data packet based on the second audio synchronization signal packet.

9. The receiver according to claim 7, wherein
said receiver is equipped to a seat in a passenger transportation facility.

10. A digital data delivery system, comprising:
a transmission facility that includes a transmission server and digitally delivers a data packet through a transmission channel; and
a reception facility which includes a first receiver and a second receiver for receiving the data packet,
wherein:
said transmission server includes:
a generating section that generates (1) a first video data packet having digital data of video information of a first content and digital data of first video reproduction timing information on a timing at which the digital data of video information of the first content is reproduced, (2) a first video synchronization signal packet having a first video synchronization signal which includes a first video data reproducing base time value that correlates the first video reproduction timing information with a first time on a first predetermined reference time axis, (3) a first audio data packet having digital data of audio information of the first content and digital data of first audio reproduction timing information on a timing at which the digital data of audio information of the first content is reproduced, and (4) a first audio synchronization signal packet having a first audio synchronization signal which includes a first audio data reproducing base time value that correlates the first audio reproduction timing information with a second time on the first predetermined reference time axis; and a delivering section that delivers
(1) the first video data packet and (2) the first video synchronization signal packet to said first receiver and deliver (3) the first audio data packet and (4) the first audio synchronization signal packet to said second receiver without synchronizing a timing of delivering the first video data packet and a timing of delivering the first audio data packet with each other;
said first receiver receives the first video data packet and the first video synchronization signal packet and includes:
a first buffer section that buffers the first video data packet;
a first clock signal generating section that adjusts a clock signal based on the first video synchronization signal packet; and
a first decoder section that reproduces the first video data packet based on the first video reproduction timing information and a first clock signal generated by said first clock signal generating section; and said second receiver that receives the first audio data packet and the first audio synchronization signal packet and includes: a second buffer section that buffers the first audio data packet;
a second clock signal generating section that adjusts a clock signal based on the first audio synchronization signal packet; and
a second decoder section that reproduces the first audio data packet based on the first audio reproduction timing information and a second clock signal generated by said second clock signal generating section.

11. The digital data delivery system according to claim 10, wherein
said generation section further generates a second video data packet including digital data of video information of a second content and digital data of second video reproduction timing information on a timing at which the digital data of video information of the second content is reproduced, and a second video synchronization signal packet including a second video synchronization signal which includes a second video data reproducing base time value that correlates the second video reproduction timing information with a third time on a second predetermined reference time axis;
said delivering section further delivers the second video data packet and the second video synchronization signal packet to said second receiver; and
said second receiver receives
the second video data packet and
the second video synchronization signal packet and further includes:
a third buffer section that buffers the second video data packet;
a third clock signal generating section that adjusts a clock signal based on the second video synchronization signal packet; and
a third decoder section that reproduces the second video data packet based on the second audio reproduction timing information and a third clock signal generated by said third clock signal generating section.

12. The digital data delivery system according to claim 10, wherein
said transmission facility further comprises a radio-wave repeater connected with said transmission server with a wired transmission channel; and
said transmission channel between said radio-wave repeater and said reception facility is a wireless transmission channel.

13. The digital data delivery system according to claim 10, wherein
said delivering section of said transmission server delivers a data packet of the first content or a plurality of contents which includes the first content to said first receiver and said second receiver according to a multicast scheme.

14. The digital data delivery system according to claim 13, wherein
said transmission server further includes a contents reference table generating section that generates a contents reference table which is information on a method for delivering the first content or the plurality of contents; and
said delivering section delivers the contents reference table to said first receiver and said second receiver.

15. The digital data delivery system according to claim 14, wherein the contents reference table includes information on at least one of a port number and a multicast address which said delivering section uses for delivering the audio data packet, the audio synchronization signal packet, the video data packet, and the video synchronization signal packet which are included in either one content of the first content or the plurality of contents.

16. A method for, in a digital data delivery system comprising a transmission facility that digitally delivers a plurality of data packets through a transmission channel and a reception facility that includes at least two receivers for receiving the plurality of data packets, delivering the plurality of data packets from the transmission facility to the first receiver and the second receiver of the reception facility, comprising:

generating a first delivery data packet which includes digital data of video information of a content and digital data of video reproduction timing information on a timing at which the digital data of video information is reproduced;

generating a second delivery data packet which includes digital data of audio information of the same content and digital data of audio reproduction timing information on a timing at which the digital data of audio information is reproduced;

generating a first synchronization signal packet including a first data base time value which correlates a reproduction timing of the first delivery data packet with a first time on a predetermined reference time axis;

generating a second synchronization signal packet including a second data base time value which correlates a reproduction timing of the second delivery data packet with a second time on the predetermined reference time axis;

delivering the first delivery data packet and the first synchronization signal packet to the first receiver; and delivering the second delivery data packet and the second synchronization signal packet to the second receiver without synchronizing said delivering the first delivery data packet and the first synchronization signal packet.

17. The method according to claim 16, wherein said delivering the first delivery data packet and the first synchronization signal packet delivers the first delivery data packet as an RTP packet and the first synchronization signal as an RTCP packet; and said delivering the second delivery data packet and the second synchronization signal packet delivers the second delivery data packet as an RTP packet and the second synchronization signal as an RTCP packet.

18. The method according to claim 16, wherein said delivering the first delivery data packet and the first synchronization signal packet and said delivering the second delivery data packet and the second synchronization signal packet deliver data packets by using a multicast scheme, and further comprising:

generating a contents reference table which is information on a method for delivering contents; and delivering the contents reference table to the first receiver and the second receiver.

19. A transmission server for digitally delivering a data packet to a receiver through a transmission channel, comprising:

a generating section that generates (1) a first data packet including digital data of video information of a content, digital data of video reproduction timing information on a timing at which the digital data of video information is reproduced, and a video synchronization signal which includes a video data reproduction base time value that correlates the video reproduction timing information with a first time on a predetermined reference time axis and (2) a second data packet including digital data of audio information of the same content, digital data of audio reproduction timing information on a timing at which the digital data of audio information is reproduced, and an audio synchronization signal which includes an audio data reproducing base time value that correlates the audio reproduction timing information with a second time on the predetermined reference time axis; and a delivering section that is configured to deliver the first data packet to a first receiver and the second data packet to a second receiver without synchronizing a timing of delivering the first data packet and a timing of delivering the second data packet with each other.

* * * * *